US010593165B2

(12) United States Patent
Yamazaki et al.

(10) Patent No.: US 10,593,165 B2
(45) Date of Patent: Mar. 17, 2020

(54) AUXILIARY UNIT FOR SENSOR UNITS

(71) Applicant: Keyence Corporation, Osaka (JP)

(72) Inventors: Kentaro Yamazaki, Osaka (JP); Akinori Nagata, Osaka (JP)

(73) Assignee: Keyence Corporation, Osaka (JP)

( * ) Notice: Subject to any disclaimer, the term of this patent is extended or adjusted under 35 U.S.C. 154(b) by 33 days.

(21) Appl. No.: 16/100,248

(22) Filed: Aug. 10, 2018

(65) Prior Publication Data

US 2019/0096199 A1 Mar. 28, 2019

(30) Foreign Application Priority Data

Sep. 27, 2017 (JP) ................. 2017-186818

(51) Int. Cl.
| | |
|---|---|
| *G08B 5/36* | (2006.01) |
| *G08B 25/06* | (2006.01) |
| *G01V 8/00* | (2006.01) |
| *G01V 8/20* | (2006.01) |

(52) U.S. Cl.
CPC ............ *G08B 5/36* (2013.01); *G01V 8/00* (2013.01); *G01V 8/20* (2013.01); *G08B 25/06* (2013.01)

(58) Field of Classification Search
None
See application file for complete search history.

(56) References Cited

U.S. PATENT DOCUMENTS

| | | | | |
|---|---|---|---|---|
| 5,459,450 | A * | 10/1995 | Beghelli ............... | G08B 25/06 340/538 |
| 6,891,838 | B1 * | 5/2005 | Petite .................. | H04L 12/2825 340/870.02 |
| 8,237,587 | B2 | 8/2012 | Fukumura | |
| 8,346,510 | B2 | 1/2013 | Fukumura et al. | |
| 2002/0125998 | A1 * | 9/2002 | Petite .................... | G01D 4/004 340/286.01 |
| 2003/0098789 | A1 * | 5/2003 | Murakami ....... | G08B 13/19634 340/506 |

(Continued)

FOREIGN PATENT DOCUMENTS

JP 2002-260770 A 9/2002

OTHER PUBLICATIONS

U.S. Appl. No. 16/100,243, filed Aug. 10, 2018 (62 pages).

(Continued)

*Primary Examiner* — Curtis J King
(74) *Attorney, Agent, or Firm* — Kilyk & Bowersox, P.L.L.C.

(57) ABSTRACT

To provide an auxiliary unit capable of reducing the number of signal lines for outputting warning information. A multi-output unit is connected to a plurality of sensor units via individual output lines 262a to 262h through which the plurality of sensor units output a detection result of each of the plurality of sensor units and a data line 261a for communicating with the plurality of sensor units. The communication control unit 104 communicates with each of the plurality of sensor units via the data line 261a and receives warning information transmitted by at least one of the plurality of sensor units. When receiving the warning information from at least one of the plurality of sensor units via the data line 261a, the common signal line 154 outputs a common output signal indicating the warning information to an external device.

14 Claims, 15 Drawing Sheets

(56) References Cited

U.S. PATENT DOCUMENTS

| | | | |
|---|---|---|---|
| 2004/0075552 A1* | 4/2004 | Rao | G08B 21/10 340/539.1 |
| 2006/0227001 A1* | 10/2006 | Petricoin | G08B 3/10 340/815.4 |
| 2007/0030168 A1* | 2/2007 | Kim | H04Q 9/00 340/870.07 |
| 2007/0152808 A1* | 7/2007 | LaCasse | G08B 7/062 340/524 |
| 2008/0027586 A1* | 1/2008 | Hern | A01G 25/167 700/284 |
| 2010/0045477 A1* | 2/2010 | Saitou | G05B 19/41855 340/9.1 |
| 2010/0134301 A1* | 6/2010 | Borth | A01M 1/026 340/573.2 |
| 2013/0278410 A1* | 10/2013 | Smith | G08B 25/00 340/517 |
| 2014/0361888 A1* | 12/2014 | Huang | G08B 5/36 340/539.1 |
| 2015/0006778 A1* | 1/2015 | Leo | G06F 13/4022 710/306 |
| 2016/0021434 A1* | 1/2016 | Arakawa | H04Q 9/00 340/870.01 |
| 2017/0352240 A1* | 12/2017 | Carlton-Foss | A61B 5/1117 |
| 2018/0097721 A1* | 4/2018 | Matsui | H04L 45/28 |
| 2018/0112837 A1* | 4/2018 | Sadwick | F21K 9/27 |
| 2018/0303049 A1* | 10/2018 | Weiler | G05B 19/042 |
| 2018/0307253 A1* | 10/2018 | Weiler | G05B 19/042 |
| 2019/0158312 A1* | 5/2019 | Junkin | H04L 12/4641 |
| 2019/0278004 A1* | 9/2019 | Hern | G01K 13/00 |

OTHER PUBLICATIONS

U.S. Appl. No. 16/100,244, filed Aug. 10, 2018 (61 pages).
U.S. Appl. No. 16/100,247, filed Aug. 10, 2018 (90 pages).
U.S. Appl. No. 15/928,518, filed Mar. 22, 2018 (97 pages).
U.S. Appl. No. 15/928,499, filed Mar. 22, 2018 (59 pages).

\* cited by examiner

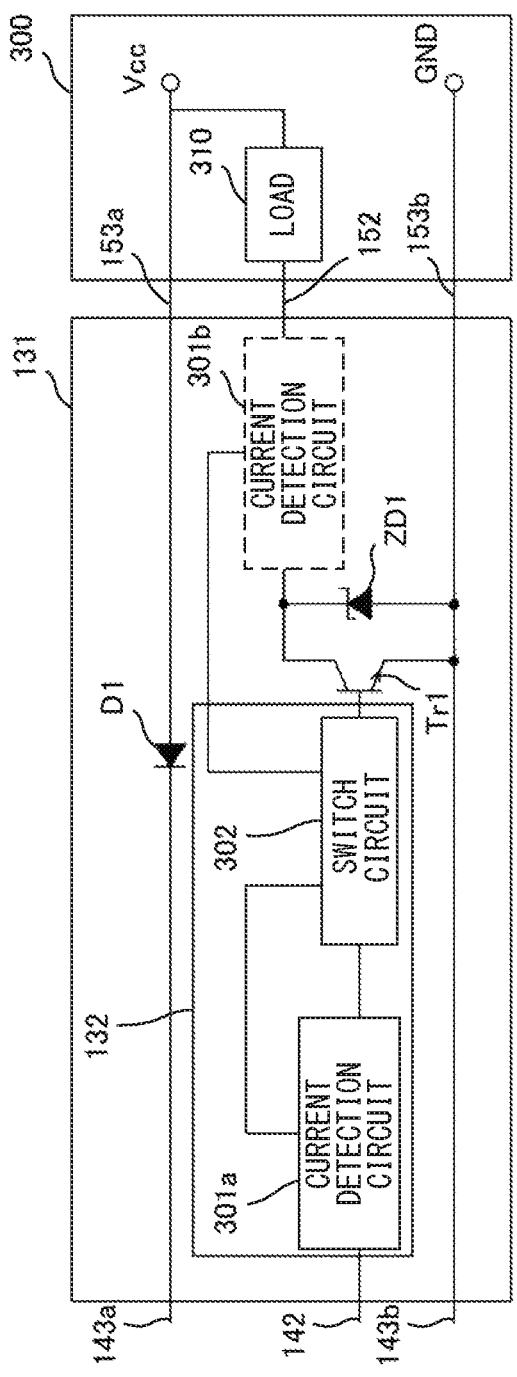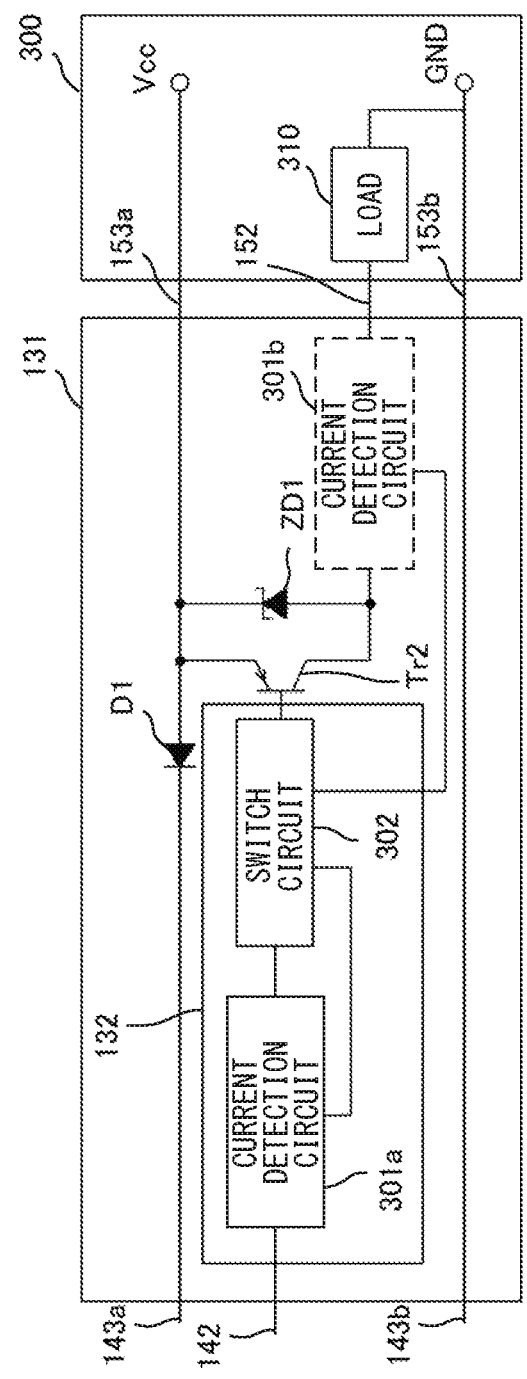

AUXILIARY UNIT FOR SENSOR UNITS

CROSS-REFERENCE TO RELATED APPLICATIONS

The present application claims foreign priority based on Japanese Patent Application No. 2017-186818, filed Sep. 27, 2017, the contents of which is incorporated herein by reference.

BACKGROUND OF THE INVENTION

1. Field of the Invention

The present invention relates to an auxiliary unit for sensor units that collectively outputs detection results of a plurality of sensor units.

2. Description of Related Art

A product (work) produced in a factory is conveyed by a conveying apparatus such as a belt conveyor. Arrival of the work at a predetermined place is detected by a photoelectric switch. Depending on a factory, a large number of photoelectric switches are coupled and used. If a cable is connected to each of the photoelectric switches, the number of cables increases. Labor and time for cable wiring increase. Further, a space for wiring the cables is necessary. A large number of cables are often bound by a clamping band in a factory. However, the clamping band needs to be, for example, cut when one cable is replaced. This is troublesome work.

Japanese Patent No. 4519339 proposes that signal lines extending from a plurality of sensor slave units are consolidated in a sensor master unit.

A sensor unit such as a photoelectric switch or a pressure sensor includes a signal line for transmitting a detection result. In addition, a signal line for outputting a warning signal to an external device and a signal line for inputting a control signal from the external device are sometimes added. These signal lines increase in proportion to the number of sensor units.

SUMMARY OF THE INVENTION

Therefore, an object of the present invention is to provide an auxiliary unit for sensor units capable of reducing the number of signal lines for outputting warning information.

For example, the present invention provides an auxiliary unit for sensor units connected to a plurality of sensor units via a plurality of detection signal lines through which the plurality of sensor units output a detection result of each of the plurality of sensor units and a communication line for communicating with the plurality of sensor units, the auxiliary unit for sensor units including: a receiving unit configured to communicate with each of the plurality of sensor units via the communication line and receive warning information transmitted by at least one of the plurality of sensor units; a common output line for outputting the warning information to an external device when receiving the warning information from at least one of the plurality of sensor units via the communication line; and a plurality of individual output lines for individually outputting a detection result of each of the plurality of detection signal lines to the external device.

According to the present invention, an auxiliary unit for sensor units capable of reducing the number of signal lines for outputting warning information is provided.

BRIEF DESCRIPTION OF THE DRAWINGS

FIGS. 10A and 10B are diagrams for explaining an individual output circuit;

DESCRIPTION OF EMBODIMENTS

An embodiment of the present invention is explained below. The individual embodiment explained below would be useful for understanding various concepts such as a superordinate concept, an intermediate concept, and a subordinate concept of the present invention. The technical scope of the present invention is decided by the claims and is not limited by the individual embodiment explained below.

Figure 1:
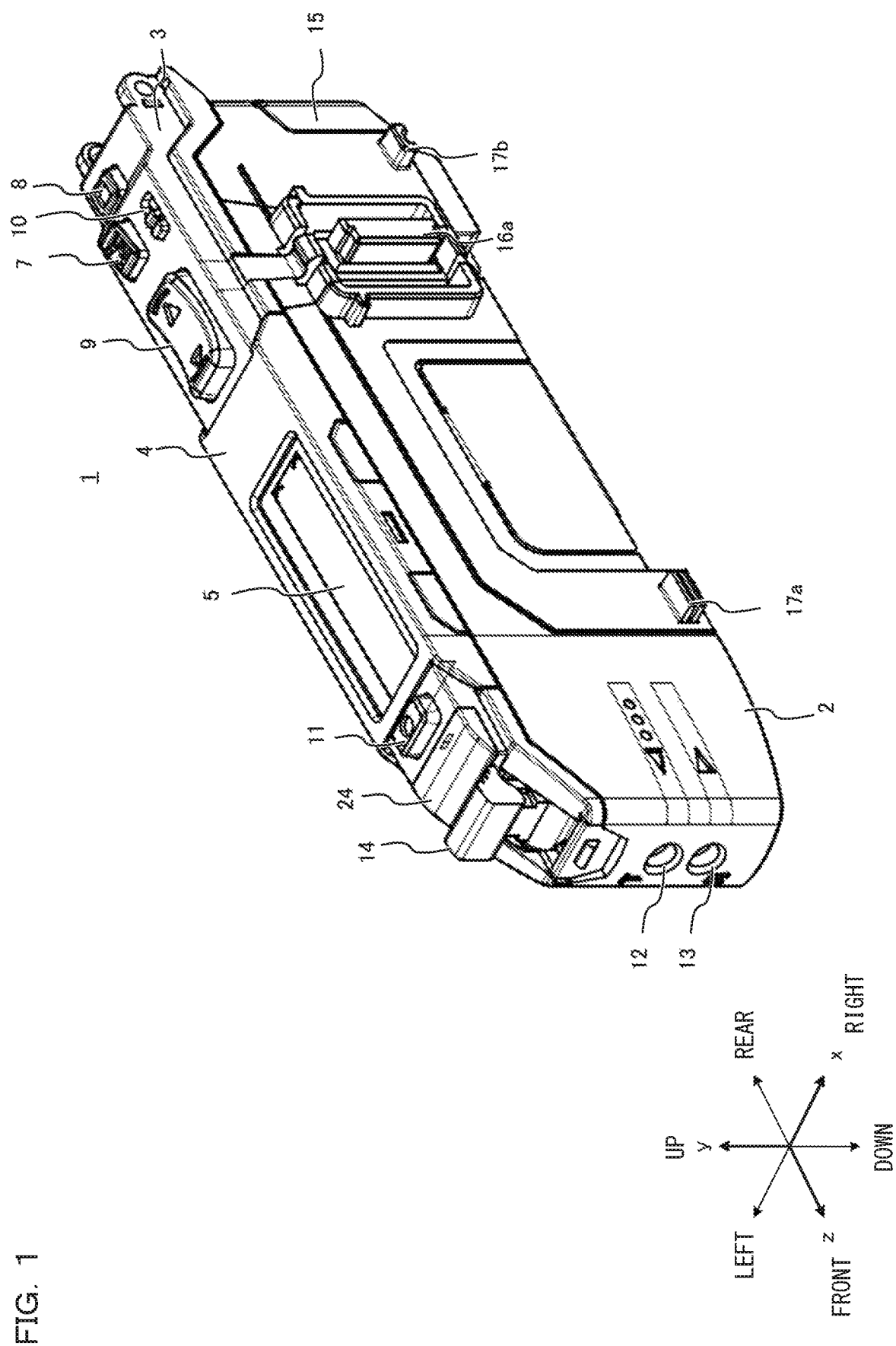
FIG. 1 is a perspective view showing a photoelectric switch.

FIG. 1 is a perspective view showing a photoelectric switch. A photoelectric switch 1 includes a substantially rectangular housing. In FIG. 1, a z axis corresponds to a longitudinal direction, an x axis corresponds to a latitudinal direction, and a y axis corresponds to a height direction. The housing generally has six outer surfaces. The six outer surfaces include an upper surface, a bottom surface, a front surface, a rear surface, a left side surface, and a right side surface. In FIG. 1, the upper surface, the front surface, and the right side surface are seen. The housing includes a lower case 2 and an upper case 3. An internal space in which a control board and the like are housed is formed by fitting the lower case 2 and the upper case 3 with each other. A part of the upper case 3 forms the upper surface. A display 5, a mode button 7, an active receiver button 8, an adjustment button 9, a slide switch 10, a set button 11, a display lamp 24, a clamp module 14, and the like are provided on the upper surface. The display 5 is a dot matrix display such as an OLED and displays a threshold and a light receiving amount. The display 5 is held and fixed by the outer surface of the upper case 3 and a cover member 4. The display 5 is provided to be offset further to the front surface side than the center of the upper surface. The adjustment button 9 is a button for increasing and reducing a threshold and operating a menu. The menu is a menu displayed on the display 5 and including various setting items for setting the operation of the photoelectric switch 1. The mode button 7 is a button for switching an operation mode related to a light projection amount and the like. The active receiver button 8 is a special button for projecting light from the photoelectric switch 1 to the outside through a light receiving fiber. When detecting depression of the active receiver button 8, the photoelectric switch 1 uses the light receiving fiber as a light projecting fiber and projects light toward the outside while receiving light made incident from the outside. The projected light is not light for detecting work and is light for assisting optical axis adjustment by a user. Note that a light emitting element configured to output the assist light may be disposed in the center of a light receiving element. In this case, a light receiving surface of the light receiving element is larger than a light emitting surface of the light emitting element. The slide switch 10 is a switch for selecting a set of a plurality of setting parameters. The set button 11 is a button for starting automatic setting of a threshold. When detecting that the set button 11 is pressed, the photoelectric switch 1 determines a threshold according to a light receiving amount. For example, when the work is detected, the display lamp 24 is lit or extinguished. The clamp module 14 is a module configured to clamp and hold the light projecting fiber and the light receiving fiber. A tubular hole 12 into which the light projecting fiber is inserted and a tubular hole 13 into which the light receiving fiber is inserted are provided on the front surface of the housing. An output cable is attached to the rear surface of the housing. A cable bush 15 is a bush for holding the output cable.

Figure 2A:
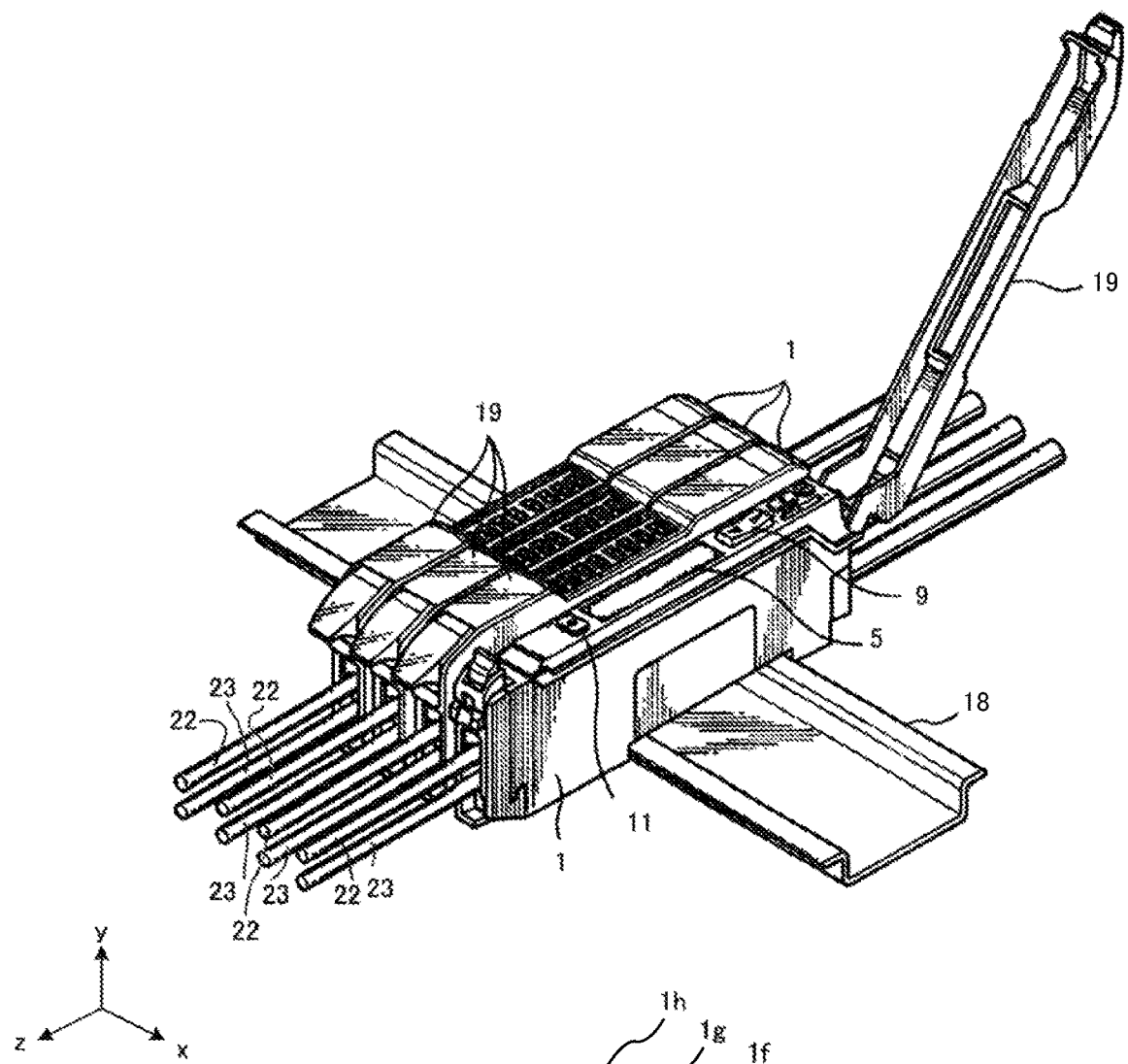
FIGS. 2A and 2B are perspectives views showing a plurality of photoelectric switches coupled to one another.
Figure 2B:
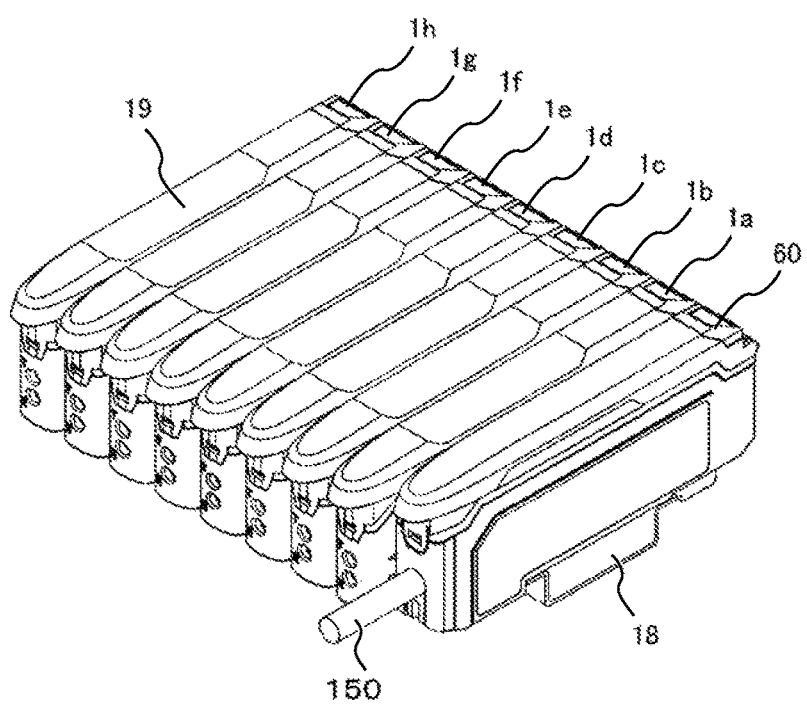

A connector 16a and coupling sections 17a and 17b are provided on the right side surface of the housing. FIGS. 2A and 2B show that a plurality of photoelectric switches 1 are respectively coupled to one another by the connectors 16a and the coupling sections 17a and 17b and fixed to a DIN rail 18. DIN is an abbreviation of Deutsches Institut für Normung. In FIG. 2A, four photoelectric switches 1 are coupled. In FIG. 2B, eight photoelectric switches 1a to 1h are coupled. Incident ends of light projecting fibers 22 of the photoelectric switches 1 are inserted into the holes 12. Emission ends of light receiving fibers 23 are inserted into the holes 13. In FIG. 2A, an open-closable upper cover 19 configured to cover the upper surface of the housing is also shown. Note that, as shown in FIG. 2B, when the upper cover 19 has light transmissivity, a hole may not be provided on the upper surface of the upper cover 19. This is because, if the upper cover 19 has light transmissivity, the user can confirm display content of the display 5 even in a closed state of the upper cover 19. When the upper cover 19 does not have light transmissivity, as shown in FIG. 2A, a hole or a window may be provided on the upper surface of the upper cover 19. The upper cover 19 functions as a dust cover. As shown in FIGS. 2A and 2B, the plurality of photoelectric switches 1 can be respectively laterally coupled. Therefore, the plurality of photoelectric switches 1 are called interconnected sensor as well.

As shown in FIG. 2B, a multi-output unit 60 may be connected to the connector 16a of the photoelectric switch 1a located on the rightmost side. The multi-output unit 60 receives detection results of a plurality of photoelectric switches 1a to 1h and outputs the detection results to an external device via a cable 150. The multi-output unit 60 transmits a common input signal input from the external device via the cable 150 to each of the plurality of photoelectric switches 1a to 1h. Further, the multi-output unit 60 outputs a warning signal output by any one of the plurality of photoelectric switches 1a to 1h to the external device as a single common output signal via the cable 150. The warning signal is not limited to an ON-OFF signal and may be information output by communication. The multi-output unit 60 may supply electric power to each of the plurality of photoelectric switches 1a to 1h. This makes it unnecessary to connect a signal cable and a power supply cable to each of the plurality of photoelectric switches 1a to 1h. The upper cover 19 may be provided in the multi-output unit 60 as well.

Figure 3:
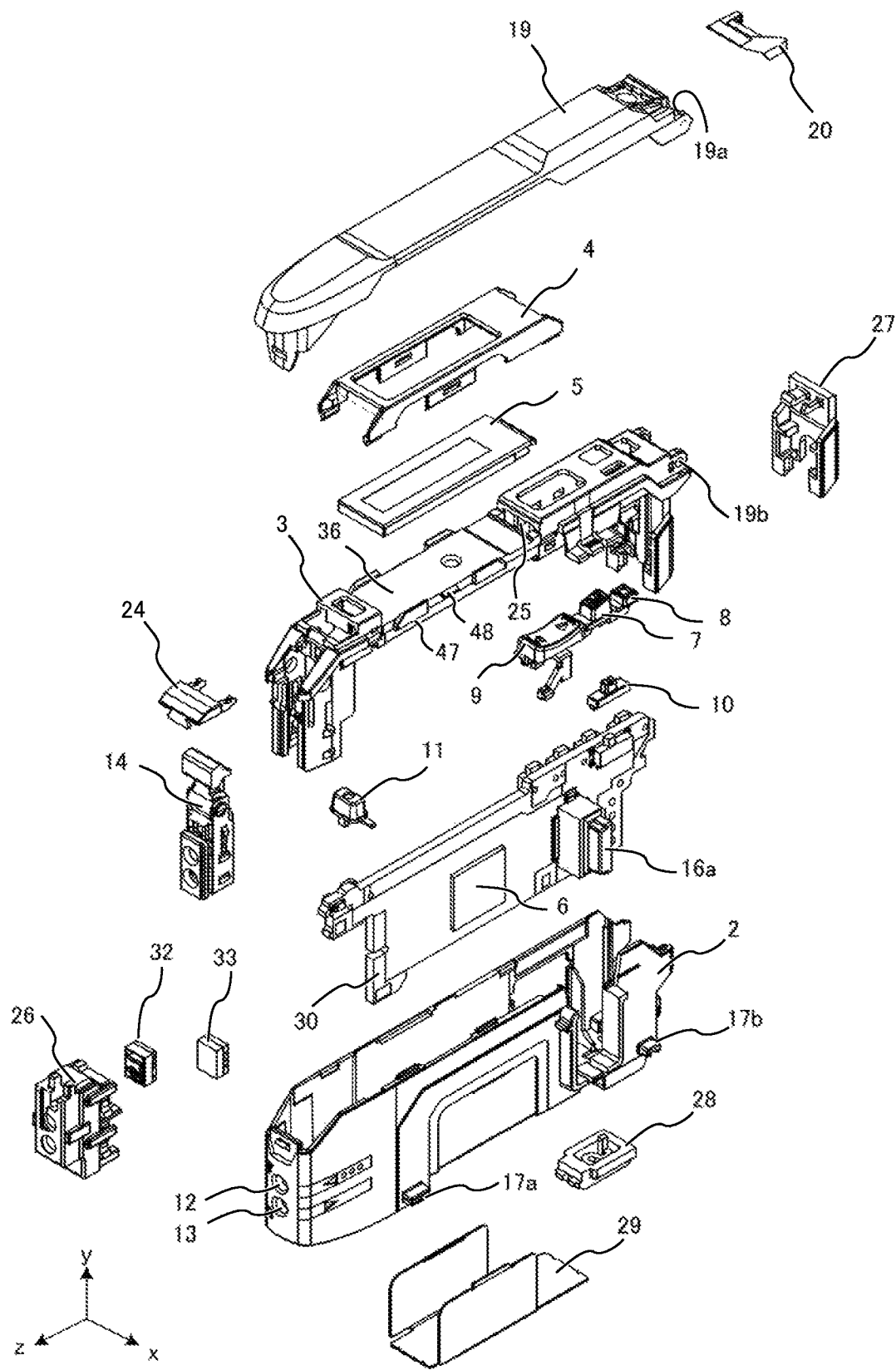
FIG. 3 are an exploded view showing the photoelectric switch.

FIG. 3 is an exploded view of the photoelectric switch 1. A decoration member 20 may be provided on the rear end side of the upper cover 19. A rotational pin 19a is provided on the rear end side of the upper cover 19. The rotational pin 19a fits in a holding hole 19b provided on the rear end side of the upper case 3. Consequently, the upper cover 19 is rotatably coupled to the upper case 3. To enable the user to confirm information displayed on the display 5 even in the closed state of the upper cover 19, the upper cover 19 may be formed by a transparent member. A backbone member 36 for supporting the display 5 is provided near the center of the upper case 3. Four fringes 47 are provided on the left and the right of the backbone member 36. The four fringes 47 are projecting sections projecting upward from the upper case 3. The four fringes 47 position the display 5 in the latitudinal direction (the x direction). Note that the four fringes 47 fit with recessed sections of the cover member 4. Two claw sections 48 are provided on the left and the right of the backbone member 36. The claw sections 48 fit with recessed sections provided on the inner side of a center leg of the cover member and fix the cover member 4 to the upper case 3. The recessed sections may be grooves or may be through-holes. An opening section 25 is provided on the rear end side of a display mounting section centering on the backbone member 36. The opening section 25 is a through-hole or a cutout for allowing a signal cable to pass from the outer surface to the inner surface side of the upper case 3. The signal cable includes a power supply line for supplying electric power to the display 5 and a control line for supplying a control signal to the display 5. The signal cable is connected to a control board 30. The control board 30 may be one substrate. If two substrates are provided in the x-axis direction, the length in the x-axis direction of the photoelectric switch 1 increases. Therefore, in this embodiment, only one control board 30 is provided in the x-axis direction. A controller 6 such as a CPU (central processing unit) is mounted on the control board 30. The controller 6 causes the display 5 to display a threshold and a light receiving amount. Switches corresponding to the adjustment button 9, the mode button 7, the active receiver button 8, the slide switch 10, and the set button 11 are mounted on the control board 30. The buttons may be formed of resin such as POM (polyacetal). Note that the upper cover 19, the cover member 4, and the housing may be basically formed of polycarbonate. An LED (light emitting diode) for supplying light to a light diffusing member of the display lamp 24 is also mounted on the control board 30. On the control board 30, the connector 16a for communicating with adjacent another photoelectric switch 1 and receiving electric power is provided. An element holder 26 is provided on the front surface side of the control board 30. A light emitting element module 32 and a light receiving element module 33 are attached to the element holder 26. The element holder 26 includes a hole for the light projecting fiber 22 inserted from the hole 12 and a hole for the light receiving fiber 23 inserted from the hole 13. The clamp module 14 is disposed on the front surface side of the element holder 26. The clamp module 14 holds the light projecting fiber 22 and the light receiving fiber 23. A fixture 28 for fixing to the DIN rail 18 and a metal cover 29 are attached to the bottom surface of the lower case 2. The metal cover 29 may play a role of heat radiation and an electromagnetic shield.

Figure 4A:
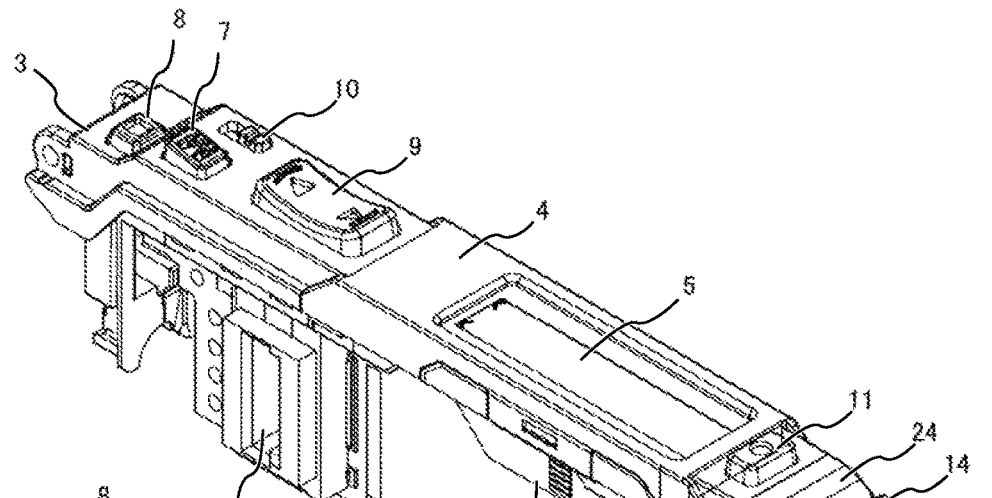
FIGS. 4A and 4B are perspective views showing the photoelectric switch.
Figure 4B:
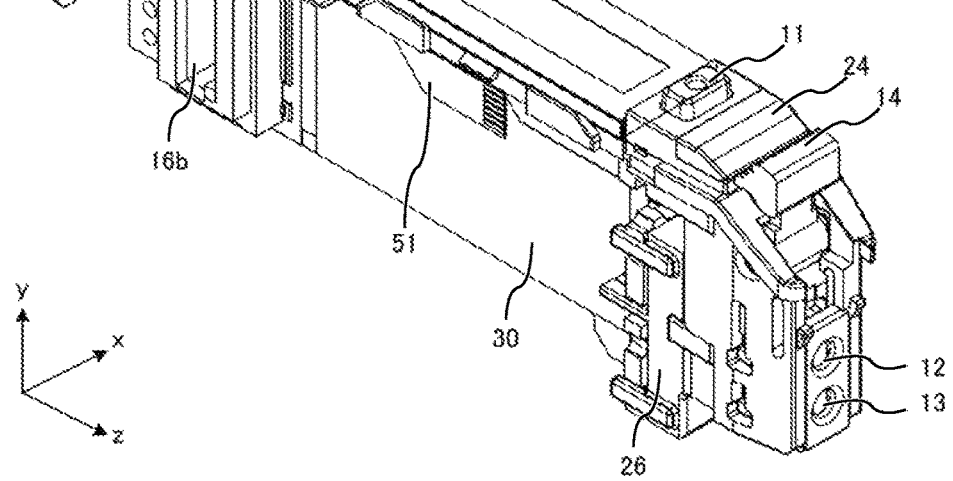

FIG. 4A is a perspective view of the photoelectric switch 1 in a state in which the cover member 4 is fixed to the upper case 3. FIG. 4B is a perspective view of the photoelectric switch 1 in a state in which the cover member 4 is not fixed to the upper case 3. Various buttons and the display 5 are fixed to the upper case 3. Further, the control board 30 is fixed to the upper case 3. A signal cable 51 electrically connected to the display 5 and the control board 30 enters the inside of the housing passing through the opening section 25. The signal cable 51 is connected to a connector of the control board 30. A connector 16b is provided on the left side surface of the control board 30. The connector 16b of the photoelectric switch 1 is a female connector. The connector 16b fits with and is electrically connected to the male connector 16a of another photoelectric switch 1 located on the left of the photoelectric switch 1.

Note that, as it is seen from FIG. 4A and the like, the height of the active receiver button 8 is smaller than the heights of the mode button 7 and the adjustment button 9. This is to prevent wrong operation of the active receiver button 8.

Figure 5:
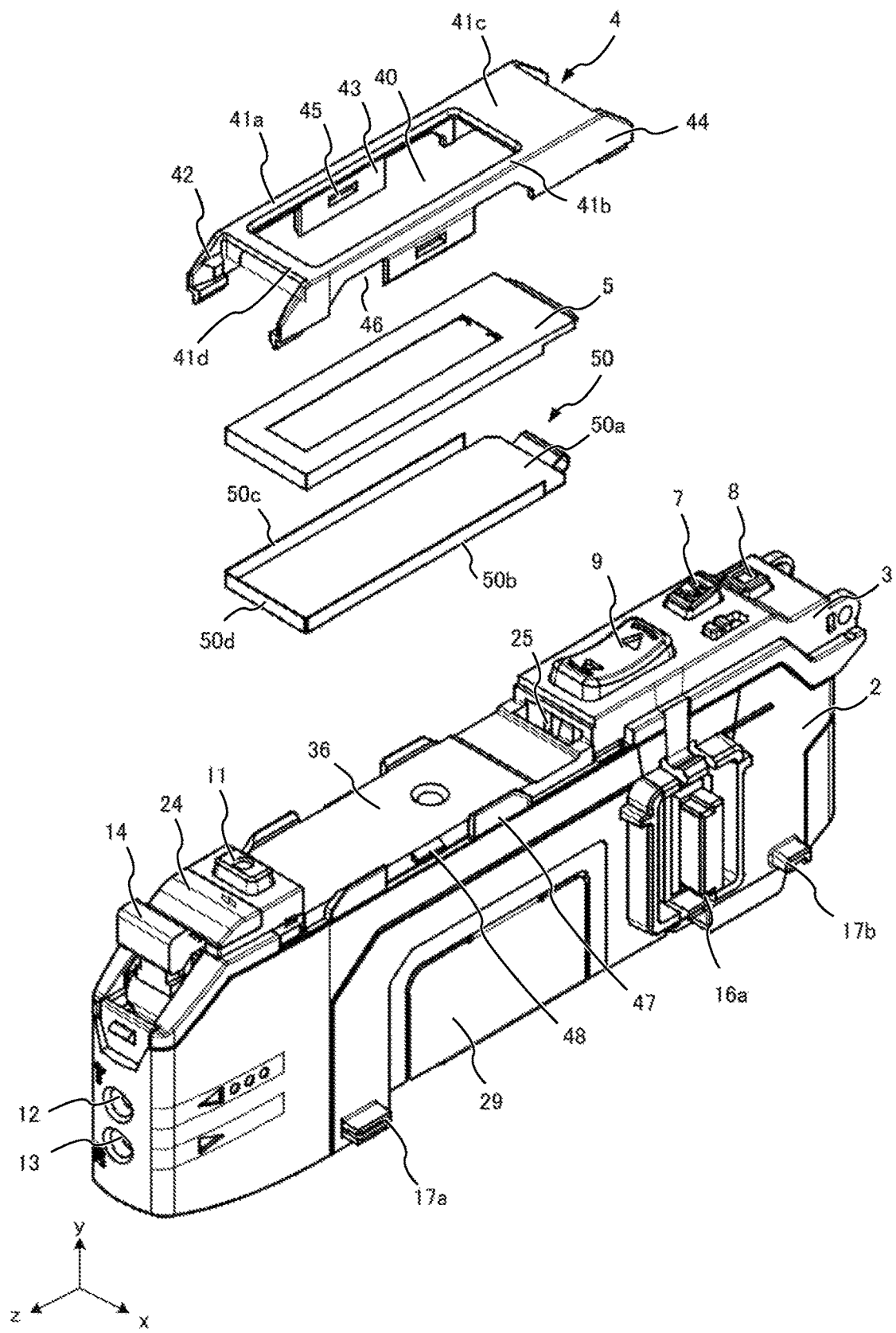
FIG. 5 is a perspective view showing a positional relation among a cover member, a display, and a shield member.

FIG. 5 is a perspective view for explaining the cover member 4 in detail. The cover member 4 includes two front legs 42, two center legs 43, and two rear legs 44. A window section 40 is provided on the upper surface of the cover member 4. The user can view a display surface of the display 5 through the window section 40. The window section 40 is surrounded by four frames. A left frame 41a and a right frame 41b are thin compared with a front frame 41d and a rear frame 41c. This is to secure a display area in the latitudinal direction of the photoelectric switch 1. The rear frame 41c has a large area compared with the other frames. This is to protect, with the rear frame 41c, for example, an IC configured to control the display 5. Character information and the like may be printed on the rear frame 41c. Because the rear frame 41c has a certain degree of an area, even if the user presses the adjustment button 9 with a finger, display information on the display 5 is less easily hidden by the finger. That is, the rear frame 41c can sufficiently separate the display 5 and the buttons from each other. Note that, because the area of the front frame 41d is small, the display lamp 24 and the display 5 can be set close to each other. Consequently, information transmitting mechanisms focused by the user can be integrated in one place. Four cutouts 46 in total are provided on the right side surface and the left side surface of the cover member 4. The four cutouts 46 fit with the four fringes 47 provided in the upper case 3, position the cover member 4 with respect to the upper case 3, and fixes the cover member 4 to the upper case 3. Recessed sections 45 are respectively provided on the inner surface sides of the two center legs 43. The recessed sections 45 fit with the claw sections 48 respectively provided on the right side surface and the left side surface of the upper case 3. A shield member 50 may be adopted to protect the front surface, the bottom surface, the left side surface, and the right side surface of the display 5. The shield member 50 includes a front wall 50d configured to protect the front surface of the display 5, a bottom section 50a configured to protect the bottom surface of the display 5, a right wall 50b configured to protect the right side surface of the display 5, and a left wall 50c configured to protect the left side surface of the display 5. The display 5 is held by the backbone member 36 and the cover member 4 in a state in which the display 5 is covered with the shield member 50. The shield member 50 is formed by an FPC (flexible printed circuit board).

Figure 6:
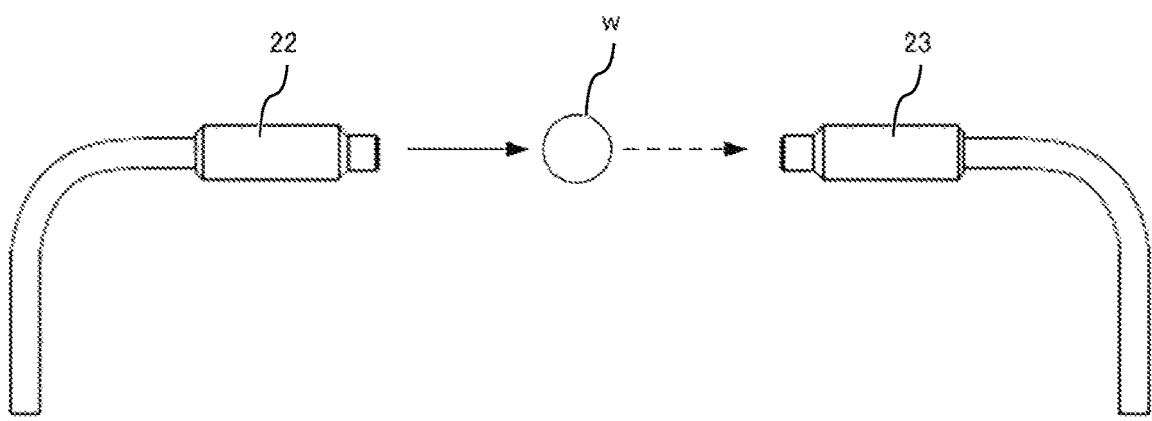
FIG. 6 is a diagram showing a photoelectric switch of a transmission type.

FIG. 6 shows the light projecting fiber 22 and the light receiving fiber 23 in the photoelectric switch 1 of a transmission type. One end of the light projecting fiber 22 emits detection light to a passing region of work w. The other end of the light projecting fiber 22 is inserted into the hole 12. Light from the light emitting element is made incident on the other end of the light projecting fiber 22. Detection light from the passing region is made incident on one end of the light receiving fiber 23. The other end of the light receiving fiber 23 is inserted into the hole 13. Light is emitted to the light receiving element from the other end. When the work w is absent in the passing region, light emitted from an emission end of the light projecting fiber 22 is made incident on an incident end of the light receiving fiber 23. When the work w is present in the passing region, the light emitted from the emission end of the light projection fiber 22 is blocked by the work w. Therefore, the light is not made incident on the incident end of the light receiving fiber 23. The controller 6 detects presence or absence of the work w according to whether light is not made incident on the light receiving fiber 23.

Note that, in the photoelectric switch 1 of a reflection type, light output from the light projecting fiber 22 is reflected on the work w. The reflected light is made incident on the light receiving fiber 23. When the work w is absent in the passing region, light emitted from the emission end of the light projecting fiber 22 is not made incident on the incident end of the light receiving fiber 23. When the work w is present in the passing region, the light emitted from the emission end of the light projecting fiber 22 is reflected by the work w. The reflected light is made incident on the incident end of the light receiving fiber 23. The controller 6 detects presence or absence of the work w according to whether light is made incident on the light receiving fiber 23. Note that the present invention is applicable to the photoelectric switch 1 of the reflection type in which a reflector is used.

Multi-Output Unit

Figure 7:
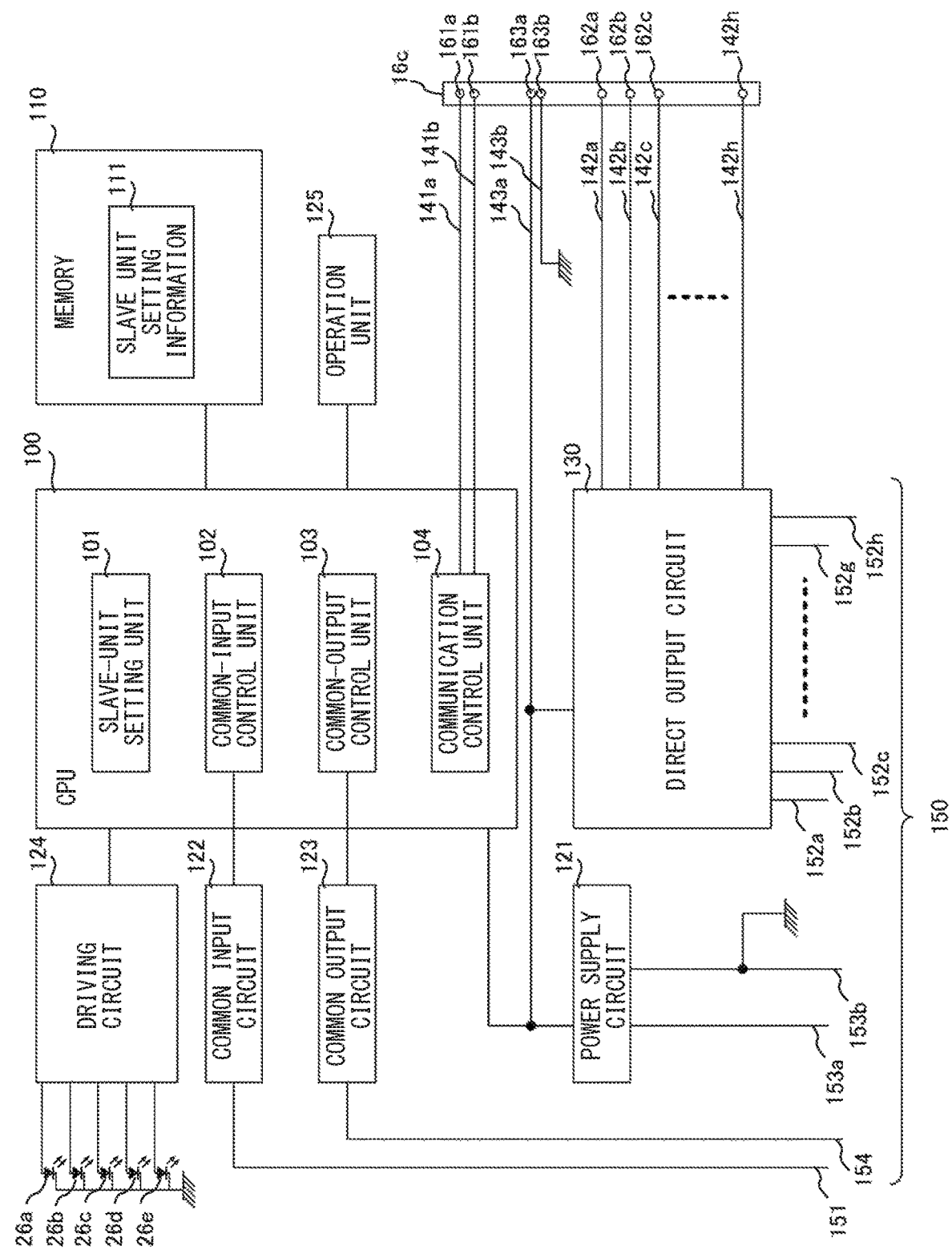
FIG. 7 is a block diagram for explaining a multi-output unit.

FIG. 7 shows an electric configuration of the multi-output unit 60. The multi-output unit 60 functions as an auxiliary unit for sensor units. A CPU 100 executes a control program stored in a memory 110 to realize various functions. The memory 110 includes a RAM and a ROM and has stored therein slave unit setting information 111 and the like. The slave unit setting information 111 is setting information of the photoelectric switch 1 connected to the multi-output unit 60. For example, the setting information may include a threshold used in detecting the work w and designation for lighting or extinguishing the display lamp 24 when the work w is detected. A slave-unit setting unit 101 has a backup function and a restore (restoration) function for slave unit setting information 111. The backup function reads out setting information from the photoelectric switches 1 through a communication control unit 104 and causes the memory 110 to retain the setting information. The restoration function is a function of transmitting the slave unit setting information 111 stored in the memory 110 to the photoelectric switches 1 and restoring the slave unit setting information 111. A common-input control unit 102 converts a common input signal input from the external device to a common input circuit 122 via a common input line 151 of the cable 150 into a common input command and transmits the common input command to the photoelectric switches 1 through the communication control unit 104. Consequently, the number of signal lines wired from the multi-output unit 60 to the photoelectric switches 1 is reduced. When warning information is received by the communication control unit 104 from any one of the photoelectric switches 1, a common-output control unit 103 causes a common output circuit 123 to generate a common output signal (High/Low) corresponding to the warning information and causes a common output line 154 to output the common output signal. Note that, when the communication control unit 104 cannot establish communication with the photoelectric switch 1 or when the communication control unit 104 detects a change in the number of the photoelectric switches 1, the common-output control unit 103 may output a common output signal to the common output line 154. The common output line 154 also configures a part of the cable 150. The communication control unit 104 is, for example, a serial communication circuit. The communication control unit 104 transmits and receives data through a data line 141a and outputs a clock signal to a clock line 141b. The data line 141a and the clock line 141b form a communication bus. The communication bus may include a signal line for transmitting a synchronization signal for informing light projection timing. When electric power is supplied to the multi-output unit 60 and the multi-output unit 60 starts, the communication control unit 104 allocates identification information to the photoelectric switches 1 via the communication bus. The identification information may be called an ID or an address as well. The communication control unit 104 may communicate with the photoelectric switches 1 to which the identification information is allocated, acquire configuration information (information that can specify a model and the like) of the photoelectric switches 1, and store the identification information and the configuration information in a memory 210 in association with each other. A power supply circuit 121 is connected to a power supply line 153a and a ground line 153b, which are parts of the cable 150. The power supply circuit 121 supplies electric power to the CPU 100, a direct output circuit 130, and the like. Further, the power supply circuit 121 supplies electric power to the photoelectric switches 1 through a power supply line 143a. A ground line 143b connected to the photoelectric switches 1 is connected to the ground line 153b. The direct output circuit 130 is a circuit connected to individual output lines 142a to 142h that respectively transmit detection results of the plurality of photoelectric switches 1a to 1h and configured to output the detection results of the plurality of photoelectric switches 1a to 1h to individual output lines 152a to 152h of the cable 150. Note that the data line 141a, the clock line 141b, the power supply line 143a, the ground line 143b, and the individual output lines 142a to 142h are respectively connected to terminals 161a, 161b, 163a, 163b, and 162a to 162h in a connector 16c. The connector 16c is connected to the connector 16a of the photoelectric switch 1a coupled to the multi-output unit 60. Therefore, the connector 16c has the same shape as the shape of the connector 16b.

In this way, information that may be transmitted at low response speed (e.g., 500 ms) such as an external input and a waring output is transmitted by the communication bus. Therefore, the number of control lines is reduced. On the other hand, high response speed is required for a detection result of the work w. Therefore, the detection result is transmitted by a control line (a signal line).

A driving circuit 124 drives various LEDs 126a to 126e to emit lights. The operation unit 125 includes switches and buttons that receive user operation.

Figure 8:
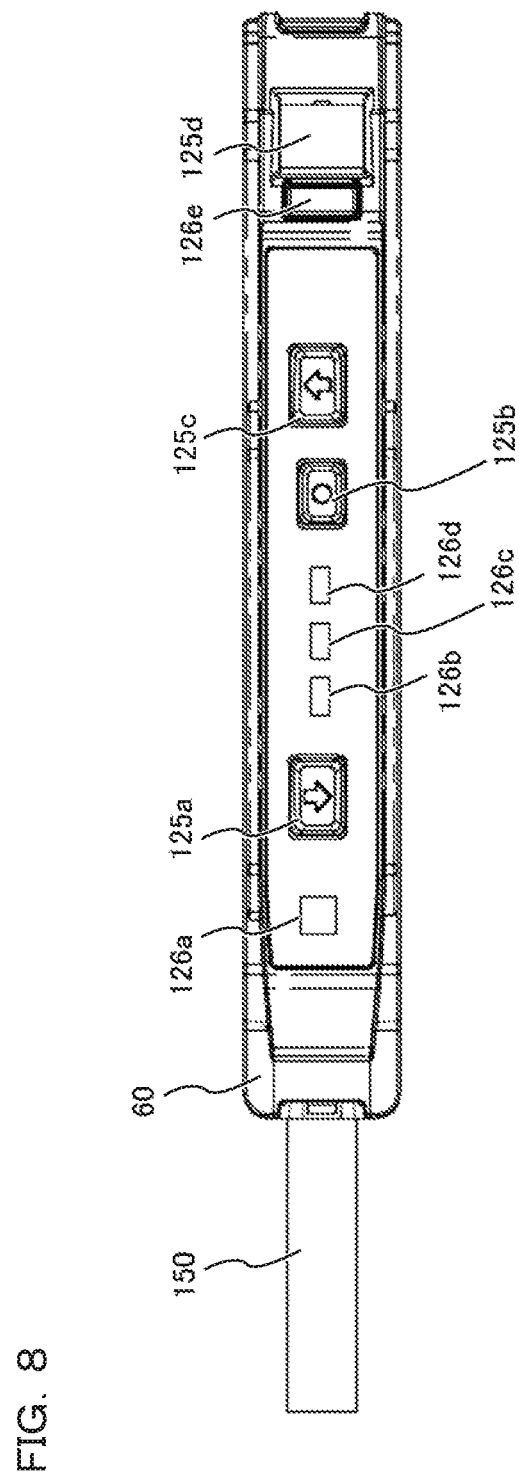
FIG. 8 is a diagram showing the upper surface of the multi-output unit.

FIG. 8 shows the upper surface of the multi-output unit 60. Note that the upper cover 19 is omitted. The LED 126a is an operation display lamp indicating an operation state (power ON/OFF) of the multi-output unit 60. The LED 126b, the LED 126c, and the LED 126d indicate which set of the slave unit setting information 111 stored in the memory 110 is applied to the photoelectric switch 1. The memory 110 can store three sets of the slave unit setting information 111. The three sets of the slave unit setting information 111 may be respectively stored in different storage regions. The LED 126e indicates whether a change of the slave unit setting information 111 is prohibited (locked). A save button 125a, which is a part of the operation unit 125, is a button for instructing backup of setting information from the photoelectric switch 1. A select button 125b is a button for designating in which set (storage region) among a plurality of sets the slave unit setting information 111 is backed up and designating the slave unit setting information 111 stored in which set is restored. A load button 125c is a button for designating that the slave unit setting information 111 stored in the memory 110 is loaded (restored) to the photoelectric switches 1. A lock button 125d is a button for prohibiting a change of the slave unit setting information 111 stored in the memory 110. The lock button 125d may be a button for prohibiting button operation of the multi-output unit and all slave units connected to the multi-output unit.

Figure 9:
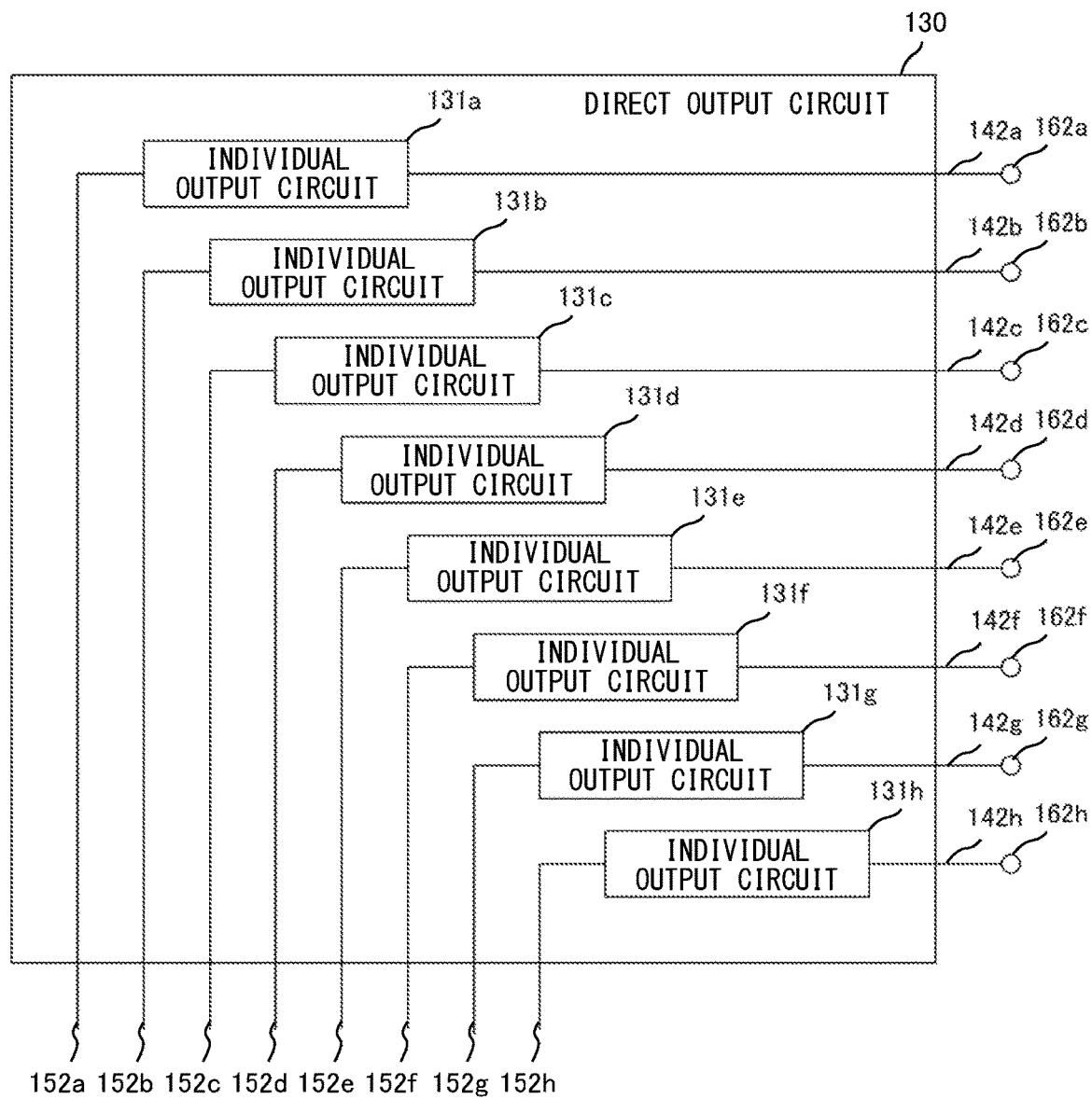
FIG. 9 is a diagram for explaining a direct output circuit.

FIG. 9 shows an internal configuration of the direct output circuit 130, Individual output circuits 131a to 131h are circuits configured to connect a plurality of individual output lines 142a to 142h and a plurality of individual output lines 152a to 152h. The individual output circuits 131a to 131h respectively include one output circuits of NPN output circuits and PNP output circuits. In some case, output circuit forms of the plurality of photoelectric switches 1a to 1h are not unified into one kind. Even in such a case, because the individual output circuits 131a to 131h are unified into one kind of an output circuit form. Therefore, the external device can neglect the polarities of the individual output lines 152a to 152h. That is, the plurality of individual output lines 142a to 142h output ON-OFF signals, the polarities of which may be any polarity. However, the polarities of the individual output lines 152a to 152h are unified into one polarity.

FIG. 10A shows an individual output circuit 131 of an NPN output type. FIG. 10B shows the individual output circuit 131 of a PNP output type. The individual output circuit 131 may include an overcurrent protection circuit 132. The overcurrent protection circuit 132 includes a current detection circuit (e.g., a resistor) 301a configured to detect an electric current flowing in an individual output line 142 and a switch circuit (e.g., a transistor) 302 configured to, when an overcurrent flows in the individual output line 142, stop an output of an individual output line 152 corresponding to the individual output line 142 in which an overcurrent is flowing. The overcurrent protection circuit 132 may include a current detection circuit (e.g., a resistor) 301b configured to detect an electric current flowing in the individual output line 152 and the switch circuit (e.g., a transistor) 302 configured to, when an overcurrent flows in the individual output line 152, stop an output of the individual output line 152 in which the overcurrent is flowing. The switch circuit 302 can be realized by a comparator configured to compare a detected electric current and a threshold and output a result of the comparison. In FIGS.

10A and 10B, a diode D1 is a rectifying element for protecting a circuit from reverse connection of a power supply. A Zener diode ZD1 is a constant voltage element. The Zener diode ZD1 protects transistors Tr1 and Tr2 from a surge voltage from a load. The transistor Tr1 is a transistor of the NPN type. The transistor Tr2 is a transistor of the PNP type.

Note that an internal circuit of the common output circuit 123 is substantially the same as the individual output circuit 131. That is, when the overcurrent protection circuit 132 provided on the inside of the common output circuit 123 detects that an overcurrent flows in the common output line 154, the overcurrent protection circuit 132 may cut an electric current flowing in the common output line 154.

Controller

Figure 11:
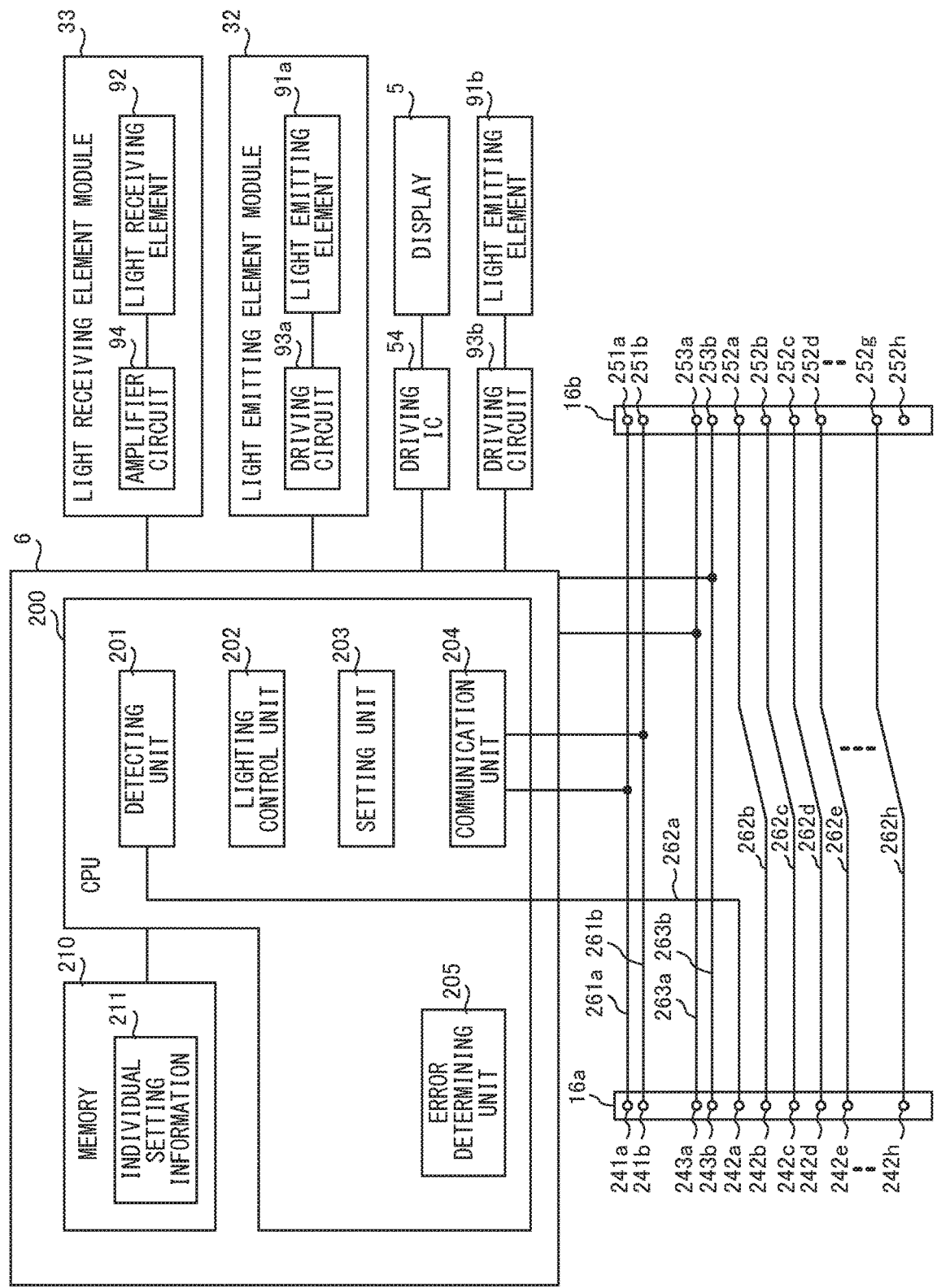
FIG. 11 is a block diagram for explaining a photoelectric switch.

FIG. 11 is a block diagram for explaining the controller 6 and the like of the photoelectric switch 1. A CPU 200 realizes various functions according to a control program stored in a ROM, which is a part of the memory 210. The memory 210 is a storage device including a RAM and the ROM. In the memory 210, for example, individual setting information 211 including a threshold Th set by the adjustment button 9 is stored.

The light emitting element module 32 includes a light emitting element 91a configured to emit detection light and make the detection light incident on the light projecting fiber 22 and a driving circuit 93a configured to supply a driving current for driving the light emitting element 91a to the light emitting element 91a. The light receiving element module 33 includes a light receiving element 92 configured to receive light made incident from the light receiving fiber 23 and output a light reception signal according to a light receiving amount and an amplifier circuit 94 configured to amplify the light receiving signal. A driving IC 54 is a circuit configured to drive the display 5 according to an instruction of the CPU 200. A driving circuit 93b is a circuit configured to drive a light emitting element 91b that supplies light to the display lamp 24.

A detecting unit 201 of the CPU 200 acquires, through an A/D converter, the light receiving amount of the detection light received by the light receiving element 92 and displays the light receiving amount on the display 5 through the driving IC 54. The detecting unit 201 compares the light receiving amount of the detection light and a threshold and outputs a result of the comparison to an individual output terminal 242a. The CPU 200 and the individual output terminal 242a are connected via an individual output line 262a. A communication section 204 is a unit configured to communicate with the multi-output unit 60 and the other photoelectric switch 1 via a data line 261a. The data line 261a connects a data terminal 241a of the connector 16a and a data terminal 251a of the connector 16b. The communication unit 204 receives a clock signal through a clock line 261b and executes transmission and reception of data in synchronization with the clock signal. The clock line 261b connects a clock terminal 241b of the connector 16a and a clock terminal 251b of the connector 16b. A lighting control unit 202 causes the light emitting element 91a to emit light with a light emitting amount retained in the individual setting information 211 and lights and extinguishes the light emitting element 91b when the work w is detected. When an error determining unit 205 detects some error or receives a lighting instruction from the multi-output unit 60, the lighting control unit 202 may light the light emitting element 91b. When receiving a backup command from the multi-output unit 60, a setting unit 203 transmits the individual setting information 211 to the multi-output unit 60 through the communication unit 204. When receiving a restoration command from the multi-output unit 60, the setting unit 203 receives the individual setting information 211 from the multi-output unit 60 through the communication unit 204 and stores the individual setting information 211 in the memory 210. The error determining unit 205 determines presence or absence of an overcurrent flowing to the individual output terminal 242a and detects some error that occurs in the photoelectric switch 1. As the error, there are, for example, a decrease in a light amount of the light emitting element 91a, a failure of the light emitting element 91a, and an error (an access failure, etc.) of the memory 210. When detecting the error, the error determining unit 205 transmits warning information to the multi-output unit 60 via the communication unit 204. The communication unit 204 may give, to the warning information, an identification information allocated by the communication control unit 104 of the multi-output unit 60 and output the warning information to the multi-output unit 60. The communication unit 204 acquires, among various kinds of information transmitting through a data line, information to which the identification information allocated to the communication unit 204 is given.

A power supply terminal 243a of the connector 16a and a power supply terminal 253a of the connector 16b are connected by a power supply line 263a. The controller 6 receives electric power through the power supply line 263a. A ground terminal 243b of the connector 16a and a ground terminal 253b of the connector 16b are connected by a ground line 263b. An individual output terminal 252a of the connector 16b is connected to an individual output terminal 242b of the connector 16a. Similarly, individual output terminals 252a to 252g of the connector 16b are respectively connected to individual output terminals 242b to 242h of the connector 16a via individual output lines 262b to 262h. An individual output terminal 252h is open. The data terminal 241a of the connector 16a is connected to the data line 141a via the connector 16c of the multi-output unit 60. The clock terminal 241b of the connector 16a is connected to the clock line 141b via the connector 16c of the multi-output unit 60. The power supply terminal 243a of the connector 16a is connected to the power supply line 143a via the connector 16c of the multi-output unit 60. The ground terminal 243a of the connector 16a is connected to the ground line 143b via the connector 16c of the multi-output unit 60. The individual output terminals 242a to 242h of the connector 16a are respectively connected to the individual output lines 142a to 142h via the connector 16c of the multi-output unit 60. Consequently, detection results of the photoelectric switches 1a to 1h are respectively output to the individual output lines 142a to 142h.

Note that the connector 16b of the photoelectric switch 1a is connected to the connector 16a of the photoelectric switch 1b. That is, the terminals 251a, 251b, 252a to 252h, 253a, and 253b of the connector 16b are respectively connected to the terminals 241a, 241b, 242a to 242h, 243a, and 243b of the connector 16a.

Common Output Control

Figure 12:
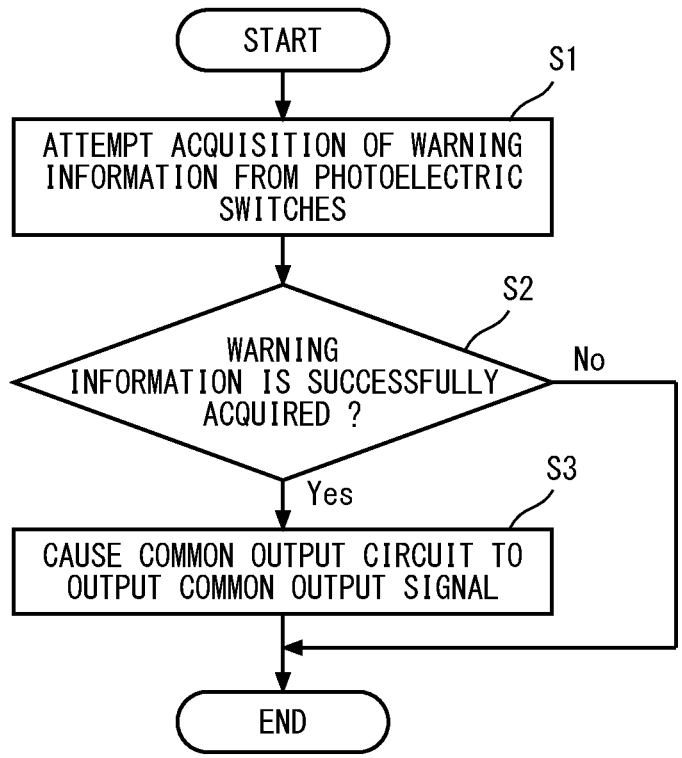
FIG. 12 is a flowchart for explaining common output control.

FIG. 12 is a flowchart for explaining common output control executed by the CPU 100.

In S1, the CPU 100 (the common-output control unit 103) controls the communication control unit 104 and attempts acquisition of warning information from the photoelectric switches 1. The communication control unit 104 may acquire the warning information from the photoelectric switches 1 through polling. The polling is not essential. For example, when the photoelectric switch 1 has warning information that should be transmitted, the photoelectric switch 1 may spontaneously transmit, to the multi-output unit 60, warning information to which identification information of the photoelectric switch 1 is given.

In S2, the CPU 100 (the common-output control unit 103) determines whether warning information is successfully acquired from any photoelectric switch 1. When the warning information is successfully acquired from any photoelectric switch 1, the CPU 100 proceeds to S3. On the other hand, when the warning information is successfully acquired from no photoelectric switch 1, the CPU 100 skips S3 and stays on standby until the next timing of common output control.

In S3, the CPU 100 (the common-output control unit 103) causes the common output circuit 123 to output a common output signal. For example, the common output circuit 123 switches a level of the common output line 154 from a low level to a high level. Note that the photoelectric switch 1 may output various kinds of warning information. However, the common-output control unit 103 simply outputs presence or absence of warning information to the external device.

Note that, in a case in which the photoelectric switches 1 spontaneously transmit the warning information to the multi-output unit 60, when receiving the warning information, the communication control unit 104 may generate interruption and cause the common-output control unit 103 to output the common output signal. This would be advantageous in terms of response speed of a common output.

Incidentally, the photoelectric switch 1 that outputs the warning information may light or flash the display lamp 24. When receiving the common output signal, the external device can recognize that some error has occurred in any photoelectric switch 1. However, the external device cannot recognize in which of the plurality of photelectric switches 1 the error has occurred. Therefore, the CPU 200 (the error determining unit 205) of the photoelectric switch 1 that outputs the warning information may light the light emitting element 91*b* through the lighting control unit 202. In this way, the display lamp 24 of the photoelectric switch 1 that outputs the warning information is lit. Therefore, the user can recognize which photoelectric switch 1 outputs the warning information.

Common Input Control

Figure 13:
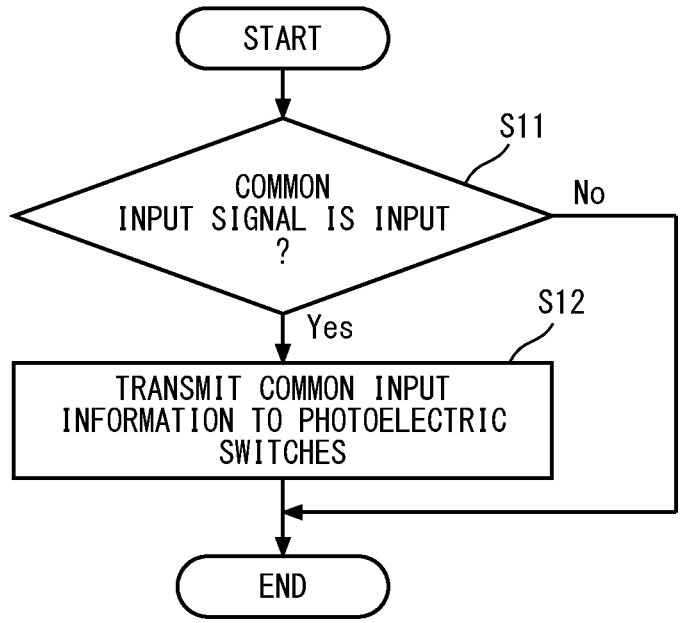
FIG. 13 is a flowchart for explaining common input control.

FIG. 13 is a flowchart for explaining common input control executed by the CPU 100.

In S11, the CPU 100 (the common-input control unit 102) determines whether a common input signal is input from the common input circuit 122. For example, the common-input control unit 102 determines whether a level of the common input line 151 connected to the common input circuit 122 is switched from a low level to a high level. When the common input signal is input from the common input circuit 122, the CPU 100 proceeds to S12. On the other hand, when the common input signal is not input from the common input circuit 122, the CPU 100 skips S12 and ends the common input control.

In S12, the CPU 100 (the common-input control unit 102) transmits common input information to the photoelectric switches 1 via the communication control unit 104.

When receiving the common input information, the photoelectric switches 1 may execute operations allocated to the photoelectric switches 1. The operations may be different for each of the photoelectric switches 1. The photoelectric switches 1 may save, in the individual setting information 211, information indicating operations that should be executed.

Backup (Save Function)

Figure 14:
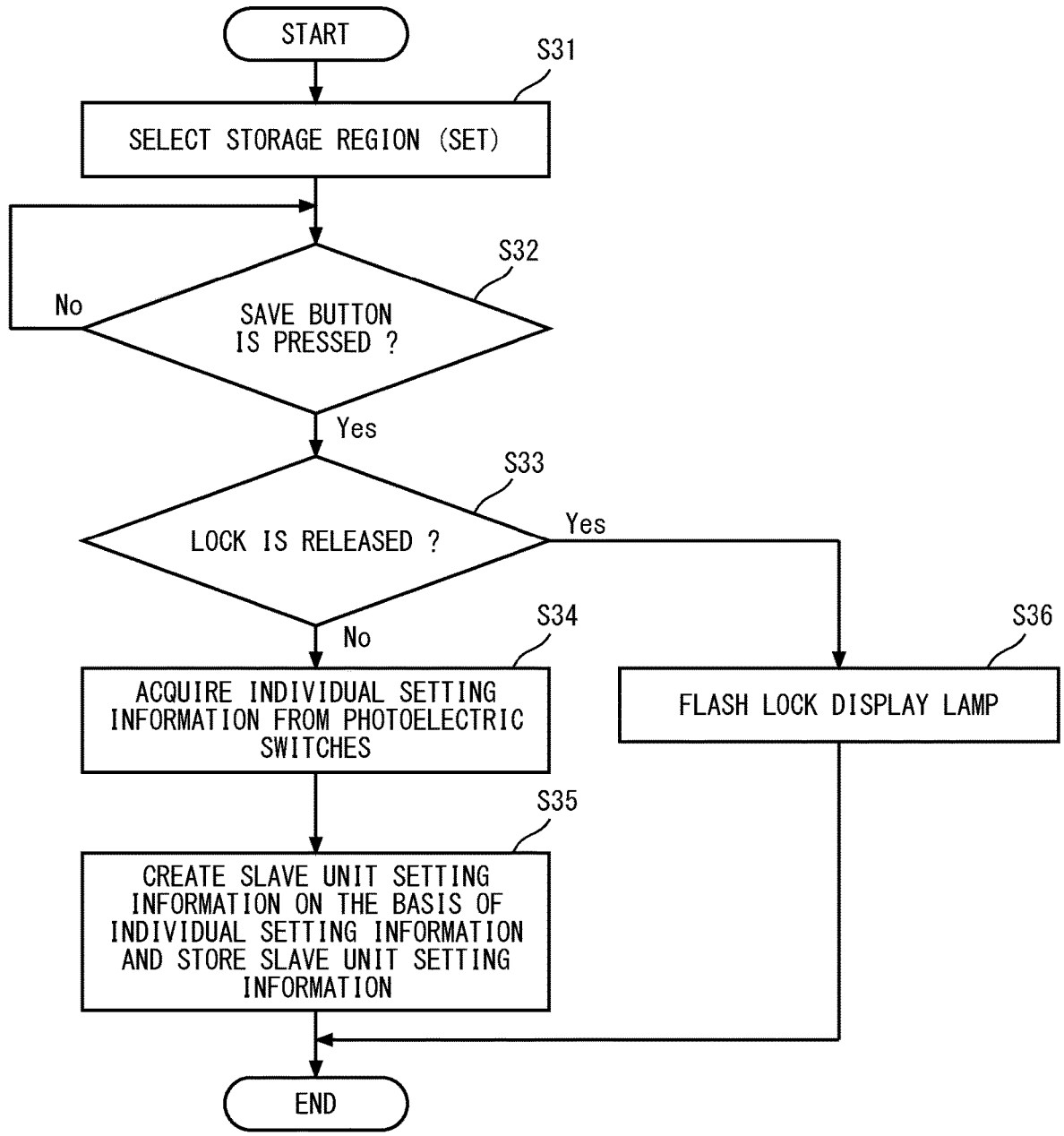
FIG. 14 is a flowchart for explaining backup processing.

FIG. 14 is a flowchart for explaining backup processing for the individual setting information 211 executed by the CPU 100 (the slave-unit setting unit 101). For example, it is assumed that a sensor system in which eight photoelectric switches 1*a* to 1*h* are coupled to the multi-output unit 60 is constructed. In this case, when one photoelectric switch 1*c* breaks down, the photoelectric switch 1*c* is replaced with another photoelectric switch 1*x*. In this case, it is not easy to manually reset the photoelectric switch 1*x*. This is because setting parameters have increased according to an increase in functions of the photoelectric switch 1*x*. When a product to be manufactured in a factory is changed, setting of a sensor system is sometimes changed (setup change). Therefore, if the setting of the sensor system is backed up in advance for each product to be manufactured, it is possible to easily perform the setup change. Therefore, the memory 110 has stored therein a plurality of kinds of slave unit setting information 111. The plurality of kinds of slave unit setting information 111 are respectively stored in different storage regions or are given set information and distinguished.

In S31, the CPU 100 selects a storage region (a set) according to operation of the select button 125*b*. Note that, in an initial state, no set may be selected. In this case, the CPU 100 may extinguish all the LEDs 126*b* to 126*d*. Every time the select button 125*b* is operated, the CPU 100 may light the LEDs 126*b* to 126*d* in order (cyclically) to notify the user which set is selected.

In S32, the CPU 100 determines whether the save button 125*a* is pressed. When the save button 125*a* is pressed. The CPU 100 proceeds to S33 in order to start backup.

In S33, the CPU 100 determines whether a lock is released. Note that, when the lock button 125*d* is pressed and a lock flag is set, the CPU 100 determines that a change and manipulation of the slave unit setting information 111 is prohibited (locked) and proceeds to S36. In S36, the CPU 100 may flash the LED 126*e* or the like functioning as a lock display lamp and notify or warn the user that a change and manipulation of the slave unit setting information 111 is prohibited (locked). On the other hand, when a change of the slave unit setting information 111 is not prohibited (locked), the CPU 100 proceeds to S34.

In S34, the CPU 100 acquires the individual setting information 211 from the photoelectric switches 1. For example, the CPU 100 transmits, to the photoelectric switches 1, via the communication control unit 104, a backup command for requesting the photoelectric switches 1 to transmit the individual setting information 211. When receiving the backup command, the CPUs 200 (the setting units 203) of the photoelectric switches 1 read out identification information, configuration information (e.g., a model), and the individual setting information 211 of the photoelectric switches 1 from the memory 210 and transmit the identification information, the configuration information, and the individual setting information 211 to the multi-output unit 60. The identification information and the configuration information may be a part of the individual setting information 211.

In S35, the CPU 100 associates the individual setting information 211 acquired from the photoelectric switches 1 with the identification information and the configuration information of the photoelectric switches 1 to create the slave unit setting information 111 and stores the slave unit setting information 111 in the memory 110. The CPU 100 stores the slave unit setting information 111 in the storage region selected in S31. The storing of the slave unit setting information 111 in the selected storage region may be giving set information (e.g., 1, 2, and 3) indicating a selected set to the slave unit setting information 111 and storing the set information in the memory 110.

Restoration (Load Function)

Figure 15:
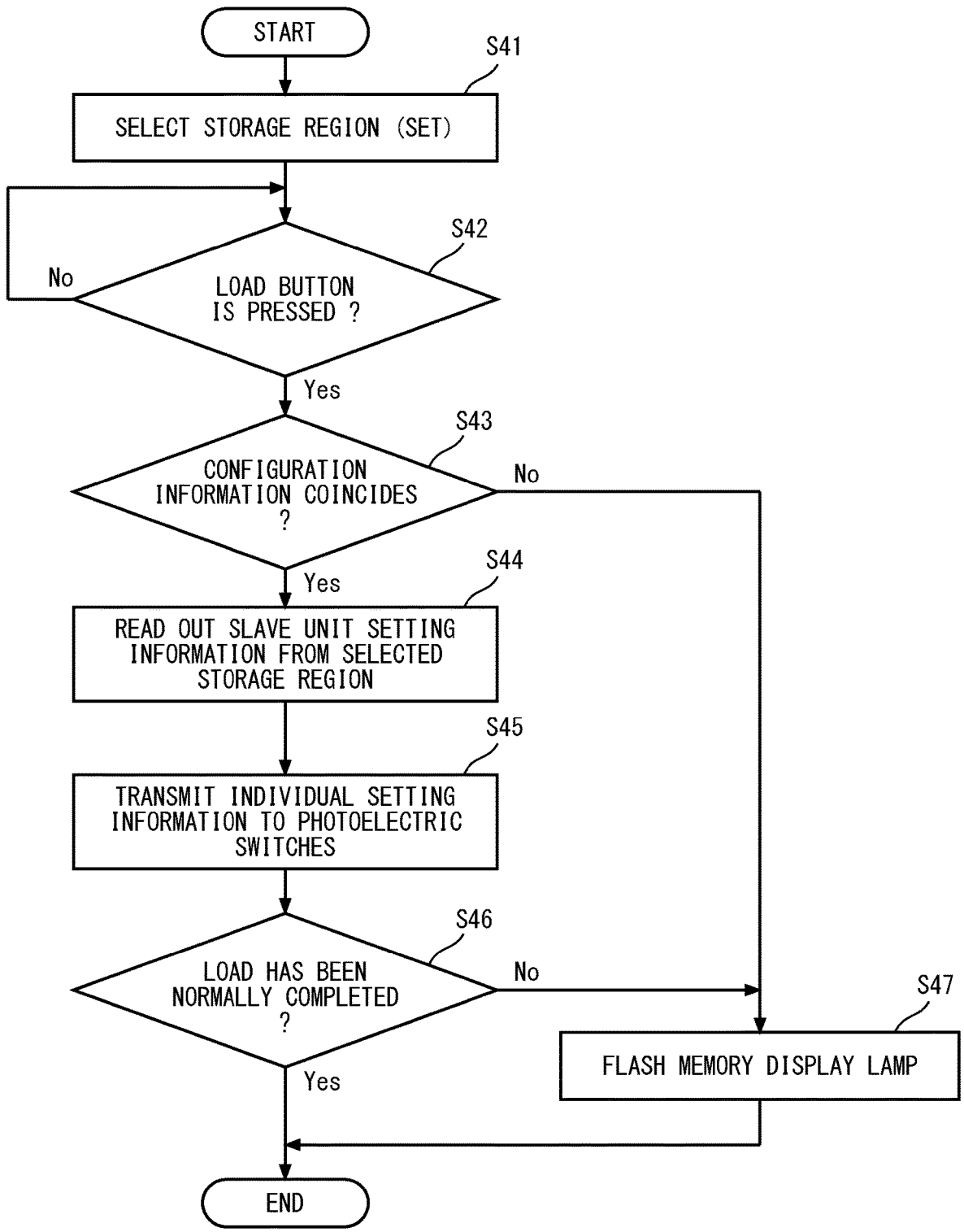
FIG. 15 is a flowchart for explaining restoration processing.

FIG. 15 is a flowchart for explaining restoration processing for the individual setting information 211 executed by the CPU 100 (the slave-unit setting unit 101).

In S41, the CPU 100 selects a storage region (a set) according to operation of the select button 125b. S41 is the same processing as S31.

In S42, the CPU 100 determines whether the load button 125c is pressed. When the load button 125c is pressed, the CPU 100 proceeds to S43 in order to start restoration.

In S43, the CPU 100 acquires configuration information from the photoelectric switches 1 via the communication control unit 104 and determines whether the acquired configuration information and the configuration information included in the slave unit setting information 111 stored in the memory 110 coincide. As explained above, the configuration information of the photoelectric switches 1 is stored in the memory 110 in association with the identification information of the photoelectric switches 1. The CPU 100 determines whether a set of received configuration information and identification information and a set of the configuration information and the identification information included in the slave unit setting information 111 coincide. For example, the CPU 100 extracts identification information given to the received configuration information and specifies, in the slave unit setting information 111, configuration information associated with the extracted identification information. Further, the CPU 100 determines whether the specified configuration information and the received configuration information coincide. This may be called collation processing of configuration information. When a plurality of photoelectric switches 1 are present, collation of configuration information is executed concerning all of the plurality of photoelectric switches 1. If the configuration information of all of the photoelectric switches 1 coincides with the configuration information of the slave unit setting information 111, The CPU 100 proceeds to S44. If the configuration information of any photoelectric switch 1 does not coincide with the configuration information of the slave unit setting information 111, the CPU 100 proceeds to S47.

In S47, the CPU 100 flashes memory display lamps (the LEDs 126b to 126d) corresponding to the selected set in order to notify noncoincidence of the configuration information to the user. The CPU 100 may flash other display lamps such as an operation display lamp (the LED 126a) instead of the LEDs 126b to 126d. Alternatively, the CPU 100 may change a lighting color of the display lamps from a first color (e.g., green) to a second color (e.g., red). In this case, two or more kinds of LEDS having different light emission colors may be mounted on the display lamps. When recognizing the noncoincidence of the configuration information, the user may operate the select button 125b again, select another parameter set (memory set), and operate the load button 125c. Consequently, restoration may be executed concerning another slave unit setting information 111.

In S44, the CPU 100 reads out the slave unit setting information 111 from the storage region selected by the select button 125b. That is, the CPU 100 reads out, from the memory 110, the slave unit setting information 111 associated with the parameter set (the memory set) selected by the select button 125b.

In S45, the CPU 100 extracts the individual setting information 211 for each of the photoelectric switches 1 from the slave unit setting information 111 and transmits the individual setting information 211 to each of the photoelectric switches 1 via the communication control unit 104.

In S46, the CPU 100 communicates with the photoelectric switches 1 via the communication control section 104 and determines whether the photoelectric switches 1 have normally completed load (restoration) of the individual setting information 211 to the memory 210. The CPUs 200 (the setting sections 203) of the photoelectric switches 1 may execute verify processing concerning the individual setting information 211 written in the memories 210 to determine whether the load of the individual setting information 211 has been completed and report a result of the determination to the multi-output unit 60 via the communication unit 204. The CPUs 200 may execute the verify processing by confirming a checksum of the individual setting information 211. If the load has not been normally completed, the CPU 100 may proceed to S47 and flash a display lamp (e.g., a memory display lamp) indicating a verify error. On the other hand, if the load has been normally completed, the CPU 100 ends the load processing.

Figure 16:
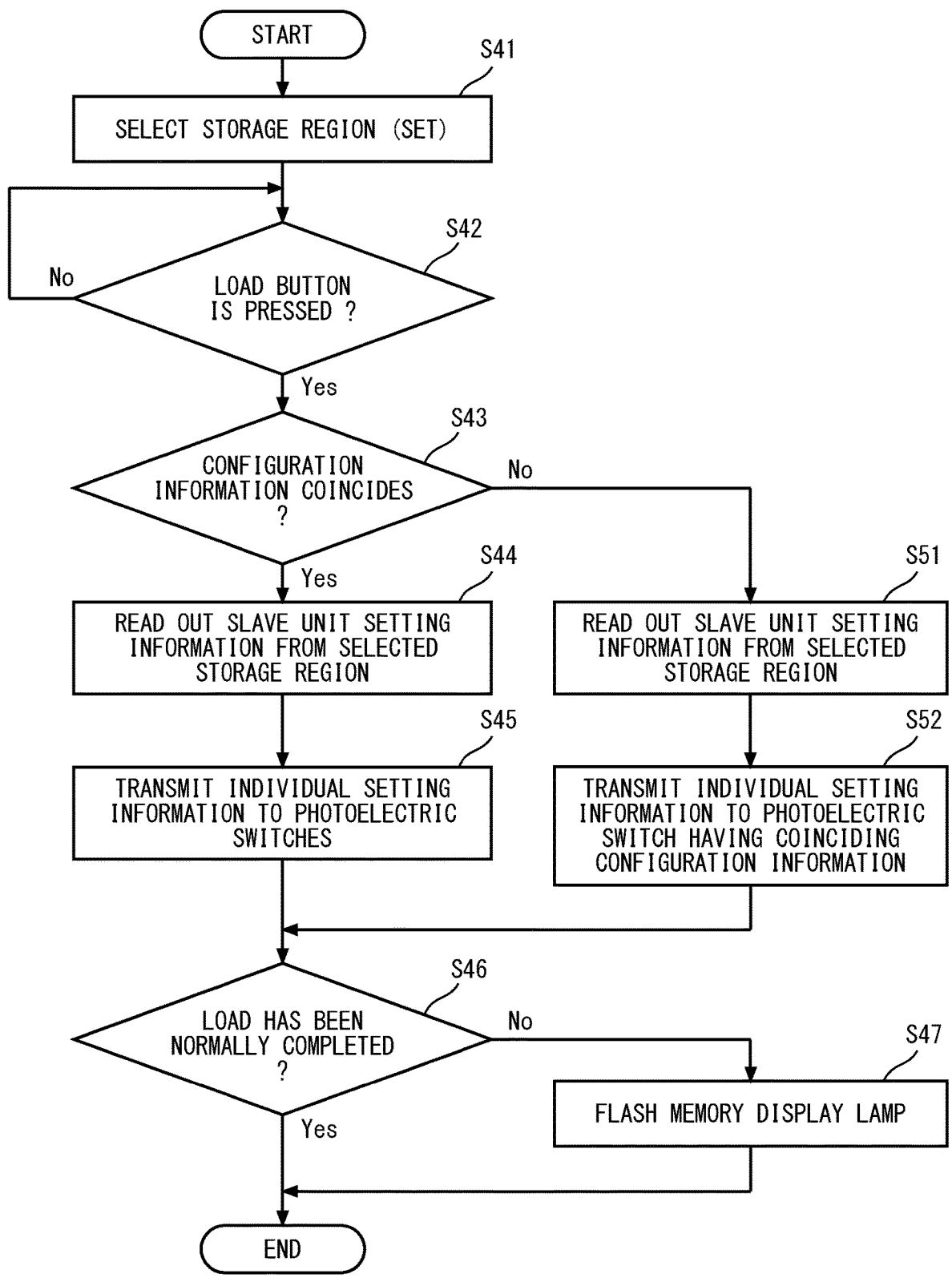
FIG. 16 is a flowchart for explaining another kind of restoration processing.

FIG. 16 is a flowchart for explaining restoration processing for the individual setting information 211 executed by the CPU 100 (the slave-unit setting unit 101). In FIG. 16, the same reference signs are assigned to steps common to FIG. 15. In FIG. 15, when the photoelectric switch 1 having noncoincident configuration information is found, the load processing to all the photoelectric switches 1 is prohibited. On the other hand, in FIG. 16, the load processing is executed concerning the photoelectric switch 1 having coincident configuration information.

When the photoelectric switch 1 having noncoincident configuration information is found in S43, the CPU 100 proceeds to S51.

In S51, the CPU 100 reads out the slave unit setting information 111 from the storage region selected by the select button 125b.

In S52, the CPU 100 extracts, from the slave unit setting information 111, the individual setting information 211 of the photoelectric switch 1, the configuration information of which is successfully collated, among the plurality of photoelectric switches 1 and transmits the extracted individual setting information 211 to the photoelectric switch 1. The individual setting information 211 is not transmitted to the photoelectric switch 1, the configuration information of which is unsuccessfully collated. Thereafter, the CPU 100 proceeds to S46.

Note that the CPU 100 may flash the LED 126a or the like functioning as the operation display lamp in order to inform the user that the individual setting information 211 is loaded (restored) to only a part of the photoelectric switches 1. The CPU 100 may transmit, through the communication control unit 104, a command for lighting or flashing the display lamp 24 of the photoelectric switch 1 unsuccessful in the load of the individual setting information 211. Alternatively, the CPU 100 may transmit, through the communication control unit 104, a command for lighting or flashing the display lamp 24 of the photoelectric switch 1 successful in the load of the individual setting information 211. The CPU 100 may output a common output signal through the common output circuit 123 when the load (the restoration) of the individual setting information 211 is unsuccessful.

Summary

As explained with reference to FIG. 1 and the like, the photoelectric switch 1 includes the housing having a substantially rectangular parallelepiped shape. That is, the housing is elongated. The display 5 is an example of a display unit attached to the outer surface, that is, a first surface of the housing. In the past, because a display is housed inside a housing of a photoelectric switch, the distance from the outer surface of the housing to the display is long and display information is less easily seen. In this embodiment, because the display 5 is attached to the outer surface of the housing, the distance from the outer edge of the photoelectric switch 1 to the display 5 is short and display information of the display 5 is easily seen. The light emitting element module 32, the hole 12, and the like are an example of a light projecting unit provided near a second surface located adjacent to the first surface. The light receiving element module 33 and the hole 13 are an example of a light receiving unit provided near the second surface located adjacent to the first surface. The adjustment button 9 and the like are an example of a receiving unit provided on the first surface or the display unit and configured to receive user operation. The controller 6 is an example of a display control unit configured to cause the display unit to display a threshold adjusted through the receiving unit and a signal value indicating an amount of light received by the light receiving unit. The control board 30 is an example of a control board (a first substrate) housed on the inside of the housing, the display control unit being mounted on or connected to the control board. The signal cable 51 is an example of a signal cable for connecting the control board 30 and the display 5. The display 5 includes a connecting section connected to the signal cable 51. The connecting section of the display 5 is disposed between the display region and the signal cable 51 in the longitudinal direction of the housing. The display 5 has two short sides and two long sides. The signal cable 51 is connected to the side of one short side of the two short sides. Consequently, a connection structure of the signal cable 51 capable of securing a sufficient display area concerning the display 5 in the photoelectric switch 1 is provided. A shield member 50 is an example of a shield member provided at least in a part of the side surface of the display 5. The cover member 4 is an example of a cover member that sandwiches the shield member 50 between the cover member 4 and the side surface of the display 5 and covers at least a part of the side surface of the display 5. In this way, the shield member 50 has a role of protecting the display 5 from a shock.

The multi-output unit 60 is connected to a plurality of sensor units via a plurality of detection signal lines (the individual output lines 262a to 262h) through which the plurality of sensor units output a detection result of each of the plurality of sensor units and a communication line (the data line 261a) for communicating with the plurality of sensor units (the photoelectric switches 1a to 1h). The communication control unit 104 functions as a receiving unit configured to communicate with each of the plurality of sensor units via the communication line and receive warning information transmitted by at least one of the plurality of sensor units. The common output line 154 is an example of a common output line for outputting the warning information to an external device when receiving the warning information from at least one of the plurality of sensor units via the communication line. The individual output lines 152a to 152h are an example of a plurality of individual output lines for individually outputting a detection result of each of the plurality of detection signal lines to the external device. In this way, according to the present invention, the warning information output by the sensor units is received via the communication line instead of the signal line. Therefore, the multi-output unit 60 capable of reducing the number of signal lines for outputting the warning information is provided.

As the warning information output by the sensor units, various kinds of warning information may be present. In the present invention, when at least one kind of warning information among the various kinds of warning information is output from any sensor unit, the common output line 154 is switched from high to low or from low to high. Therefore, it is possible to reduce the number of signals lines for outputting the warning information in exchange for an ability for transmitting a kind of the warning information to the external device.

The common-output control unit 103 and the common output circuit 123 are an example of a common output circuit configured to, when receiving the warning information from at least one of the plurality of sensor units via the communication line, generate a common warning signal based on the warning information and output the common warning signal to the common output line. The common output signal is an example of the common warning signal.

The common input circuit 122 is an example of a common input circuit to which common information, which is information common to the plurality of sensor units, is input from the external device via the common input line. The common-input control unit 102 and the communication control unit 104 are an example of a transmitting unit configured to transmit common information input to the common input circuit 122 to each of the plurality of sensor units via the communication line. In this way, according to the present invention, it is possible to reduce external input lines as well.

The connector 16c is an example of a downstream side connector coupled to an upstream side connector (the connector 16a) of a first sensor unit located adjacent to the multi-output unit 60 among the plurality of sensor units. The downstream side connector may include contacts (the individual output terminals 162a to 162h) forming a part of the plurality of detection signal lines and a contact (the data terminal 161a) forming a part of the communication line.

The power supply circuit 121 is an example of a power supply circuit configured to generate electric power supplied to the plurality of sensor units. The downstream side connector may include a part (the power supply terminal 163a and the ground terminal 163b) of a power supply line for supplying electric power generated by the power supply circuit 121 to the plurality of sensor units. Consequently, it is possible to consolidate, in the multi-output unit, power supply lines for supplying electric power to the sensor units.

The plurality of sensor units may respectively include the display lamps 24. The CPU 200 may control the light emitting elements 91b of the display lamps 24 such that the display lamp of the sensor unit that outputs warning information among the plurality of sensor units is lit. Consequently, the user can visually specify the sensor unit that outputs the warning information.

The individual output circuits 131a to 131h are an example of individual output circuits configured to connect a plurality of detection signal lines (the individual output lines 142a to 142h) and a plurality of individual output lines (the individual output lines 152a to 152h). The overcurrent protection circuit 132 may include the current detection circuit 301a configured to detect an electric current flowing in each of the plurality of detection signal lines and a switch circuit 302 configured to, when an overcurrent flows in any one of the plurality of detection signal lines, stop an output of the individual output line corresponding to the detection signal line in which the overcurrent is flowing among the plurality of individual output lines. Consequently, the sensor unit and the multi-output unit 60 are protected from the overcurrent.

The slave-unit setting unit 101 is an example of an acquiring unit configured to acquire setting parameters (the individual setting information 211) of each of the plurality of sensor units via the communication line. The memory 110 is an example of a storing unit configured to store the setting parameters of each of the plurality of sensor units acquired by the acquiring unit. Consequently, it is possible to back up setting parameters of the sensor units.

The slave-unit setting unit 101 is an example of a restoring unit configured to restore the setting parameters. The slave-unit setting unit 101 may read out the setting parameters of each of the plurality of sensor units stored in the storing unit and transmit the setting parameters of each of the plurality of sensor units via the communication line to restore the setting parameters of each of the plurality of sensor units. Consequently, it is possible to restore the setting parameters.

The memory 110 may be configured to store the setting parameters of each of the plurality of sensor units in association with identification information of the sensor units. The slave-unit setting unit 101 may be configured to acquire the identification information in order from each of the plurality of sensor units and read out the setting parameters associated with the acquired identification information from the storing unit and transmit the setting parameters. The identification information of the sensor units may be acquired, for example, when the multi-output unit 60 is started.

The select button 125*b* is an example of a selecting unit configured to select any one of a plurality of storage regions provided in the memory 110. The memory 110 may store the setting parameters of each of the plurality of sensor units in the storage region selected by the select button 125*b*. Consequently, combinations of different setting parameters are distinguished and retained in the memory 110. For example, when various types of products are manufactured in a factory, setting of sensor units is sometimes changed for each of the types of the products. Therefore, the memory 110 may retain setting parameters for each of the types of the products.

The slave-unit setting unit 101 may be configured to read out the setting parameters of each of the plurality of sensor units from the storage region selected by the select button 125*b* and transmit the setting parameters to each of the plurality of sensor units via the communication line. Consequently, the user is capable of easily restoring combinations of various setting parameters. For example, the user is capable of easily changing setting of the sensor unit for each of the types of the products.

The lock button 125*d* may function as an instructing unit configured to instruct prohibition of erasing or overwriting of the setting parameters stored in the storage region. Consequently, erroneous changes of the setting parameters would decrease. The lock button 125*d* may prohibit an input to operation units provided in the plurality of sensor units.

The slave-unit setting unit 101 may collate the setting parameters of each of the plurality of sensor units stored in each of the plurality of storage regions and setting parameters retained by each of the plurality of sensor units. Further, the slave-unit setting unit 101 may function as a specifying unit configured to specify, among the plurality of storage regions, the storage region in which setting parameters coinciding with the setting parameters retained by each of the plurality of sensor units are stored. The LEDs 126*b* to 126*d* are an example of a plurality of display lamps respectively corresponding to the plurality of storage regions. The slave-unit setting unit 101 may light, among the plurality of display lamps, the display lamp corresponding to the storage region specified by the specifying unit. Consequently, the user can recognize which set of the setting parameters is set in the sensor unit.

What is claimed is:

1. An auxiliary unit for sensor units connected to a plurality of sensor units via a plurality of detection signal lines through which the plurality of sensor units output a detection result of each of the plurality of sensor units and a communication line for communicating with the plurality of sensor units, the auxiliary unit for sensor units comprising:
   a receiving unit configured to communicate with each of the plurality of sensor units via the communication line and receive warning information transmitted by at least one of the plurality of sensor units;
   a common output line for outputting the warning information to an external device when receiving the warning information from at least one of the plurality of sensor units via the communication line; and
   a plurality of individual output lines for individually outputting a detection result of each of the plurality of detection signal lines to the external device.

2. The auxiliary unit for sensor units according to claim 1, further comprising a common output circuit configured to, when receiving the warning information from at least one of the plurality of sensor units via the communication line, generate a common warning signal based on the warning information and output the common warning information to the common output line.

3. The auxiliary unit for sensor units according to claim 1, further comprising:
   a common input circuit to which common information, which is information common to the plurality of sensor units, is input from the external device via a common input line; and
   a transmitting unit configured to transmit the common information input to the common input circuit to each of the plurality of sensor units via the communication line.

4. The auxiliary unit for sensor units according to claim 1, further comprising a downstream side connector coupled to an upstream side connector of a first sensor unit located adjacent to the multi-output unit among the plurality of sensor units, wherein
   the downstream side connector includes a contact forming a part of the plurality of detection signal lines and a contact forming a part of the communication line.

5. The auxiliary unit for sensor units according to claim 4, further comprising a power supply circuit configured to generate electric power supplied to the plurality of sensor units, wherein
   the downstream side connector includes a part of a power supply line for supplying electric power generated by the power supply circuit to the plurality of sensor units.

6. The auxiliary unit for sensor units according to claim 1, wherein the plurality of sensor units respectively include display lamps, and the display lamp of the sensor unit that outputs the warning information among the plurality of sensor units is lit.

7. The auxiliary unit for sensor units according to claim 1, further comprising:

an individual output circuit configured to connect the plurality of detection signal lines and the plurality of individual output lines;

a current detection circuit configured to detect an electric current flowing in each of the plurality of detection signal lines; and a switch circuit configured to, when an overcurrent flows in any one of the plurality of detection signal lines, stop an output of the individual output lines corresponding to the detection signal line in which the overcurrent flows among the plurality of individual output lines.

8. The auxiliary unit for sensor units according to claim 1, further comprising:

an acquiring unit configured to acquire setting parameters of each of the plurality of sensor units via the communication line; and a storing unit configured to store the setting parameters of each of the plurality of sensor units acquired by the acquiring unit.

9. The auxiliary unit for sensor units according to claim 8, further comprising a restoring unit configured to read out the setting parameters of each of the plurality of sensor units stored in the storing unit and transmit the setting parameters of each of the plurality of sensor units via the communication line to restore the setting parameters of each of the plurality of sensor units.

10. The auxiliary unit for sensor units according to claim 9, wherein the storing unit is configured to store the setting parameters of each of the plurality of sensor units in association with identification information of the sensor units, and the restoring unit is configured to acquire the identification information in order from each of the plurality of sensor units and read out the setting parameters associated with the acquired identification information from the storing unit and transmit the setting parameters.

11. The auxiliary unit for sensor units according to claim 9, further comprising a selecting unit configured to select any one of a plurality of storage regions provided in the storing unit, wherein the storing unit stores the setting parameters of each of the plurality of sensor units in the storage region selected by the selecting unit.

12. The auxiliary unit for sensor units according to claim 11, wherein the restoring unit is configured to read out the setting parameters of each of the plurality of sensor units from the storage region selected by the selecting unit and transmit the setting parameters to each of the plurality of sensor units via the communication line.

13. The auxiliary unit for sensor units according to claim 11, further comprising an instructing unit configured to instruct to prohibit erasing or overwriting of the setting parameters stored in the storage region or prohibit an input to operation units provided in the plurality of sensor units.

14. The auxiliary unit for sensor units according to claim 11, further comprising:

a specifying unit configured to collate the setting parameters of each of the plurality of sensor units stored in each of the plurality of storage regions and setting parameters retained by each of the plurality of sensor units and specify, among the plurality of storage regions, the storage region in which setting parameters coinciding with the setting parameters retained by each of the plurality of sensor units are stored; and a plurality of display lamps corresponding to each of the plurality of storage regions, wherein among the plurality of display lamps, the display lamp corresponding to the storage region specified by the specifying unit is lit.

* * * * *